(12) United States Patent
Satoyama et al.

(10) Patent No.: US 11,269,550 B2
(45) Date of Patent: Mar. 8, 2022

(54) STORAGE SYSTEM AND HISTORY INFORMATION MANAGEMENT METHOD

(71) Applicant: Hitachi, Ltd., Tokyo (JP)

(72) Inventors: Ai Satoyama, Tokyo (JP); Tomohiro Kawaguchi, Tokyo (JP); Takaki Matsushita, Tokyo (JP)

(73) Assignee: HITACHI, LTD., Tokyo (JP)

( * ) Notice: Subject to any disclaimer, the term of this patent is extended or adjusted under 35 U.S.C. 154(b) by 121 days.

(21) Appl. No.: 16/807,317

(22) Filed: Mar. 3, 2020

(65) Prior Publication Data
US 2020/0401348 A1    Dec. 24, 2020

(30) Foreign Application Priority Data
Jun. 18, 2019    (JP) .............................. JP2019-112575

(51) Int. Cl.
*G06F 3/06* (2006.01)
*G06F 11/14* (2006.01)

(52) U.S. Cl.
CPC .......... *G06F 3/0659* (2013.01); *G06F 3/0614* (2013.01); *G06F 3/0631* (2013.01); *G06F 3/0653* (2013.01); *G06F 3/0658* (2013.01); *G06F 3/0665* (2013.01); *G06F 3/0673* (2013.01); *G06F 11/1451* (2013.01); *G06F 2201/84* (2013.01)

(58) Field of Classification Search
CPC .... G06F 3/0659; G06F 3/0631; G06F 3/0665; G06F 3/0658; G06F 3/0614; G06F 3/0673; G06F 3/0653; G06F 3/0619; G06F 3/065; G06F 3/0679; G06F 11/1451; G06F 11/1471; G06F 2201/84
See application file for complete search history.

(56) References Cited

U.S. PATENT DOCUMENTS

| | | | |
|---|---|---|---|
| 8,046,549 B2 | 10/2011 | Kawamura et al. | |
| 10,866,869 B2 * | 12/2020 | Li | G06F 16/188 |
| 2008/0104347 A1 * | 5/2008 | Iwamura | G06F 3/0619 |
| | | | 711/162 |

* cited by examiner

*Primary Examiner* — Khoa D Doan
(74) *Attorney, Agent, or Firm* — Baker Botts L.L.P.

(57) ABSTRACT

A storage system includes a storage controller, plural volumes each configured by the storage controller, and a pool allocating physical storage areas to logical storage areas of the volumes. The storage controller configures a first group including, among the volumes, a first primary volume to which a first target protection period is set, and a first history information volume storing history information about updating to the first primary volume, and a second group including, thereamong, a second primary volume to which a second target protection period is set, and a second history information volume storing history information about updating to the second primary volume. The volumes included in the first and second groups utilize the same physical storage area of the pool. When increasing a free capacity thereof, history information to be purged is determined from the first and second protectable periods such that their protectable periods become the same.

9 Claims, 21 Drawing Sheets

FIG. 5

VOL MANAGEMENT TABLE 421

| VOL# 801 | VOL CAPACITY 802 | POOL# 803 | GROUP# 804 |
|---|---|---|---|
| 0 | 200GB | 0 | |
| 0 | 200GB | 0 | |
| 0 | 200GB | 0 | |
| 0 | 200GB | 0 | |
| ... | ... | ... | |

FIG. 6

ADDRESS TRANSLATION TABLE 422

| IN-VOL ADDRESS 901 | REFERENCE DESTINATION PAGE# 902 | DATA SIZE 903 |
|---|---|---|
| 0 | 100 | 1 |
| 10 | 100 | 5 |
| 20 | 200 | 10 |
| ... | ... | ... |

FIG. 7

PAGE ALLOCATION MANAGEMENT TABLE 423

| PAGE# | ALLOCATION FLAG | ALLOCATION DESTINATION VOL# | ALLOCATION DESTINATION IN-VOL ADDRESS |
|---|---|---|---|
| 0 | ALLOCATED | 0 | 100 |
| 1 | ALLOCATED | 1 | 200 |
| 2 | UNALLOCATED | - | - |
| ... | ... | ... | ... |

POOL MANAGEMENT TABLE 424

| POOL# | CAPACITY | FREE CAPACITY | GROUP# | WRITE REQUEST FREQUENCY | |
|---|---|---|---|---|---|
| 0 | | | | | |
| 1 | | | | | |
| 2 | | | | | |
| ... | ... | ... | | | |

1101, 1102, 1103, 1104, 1105

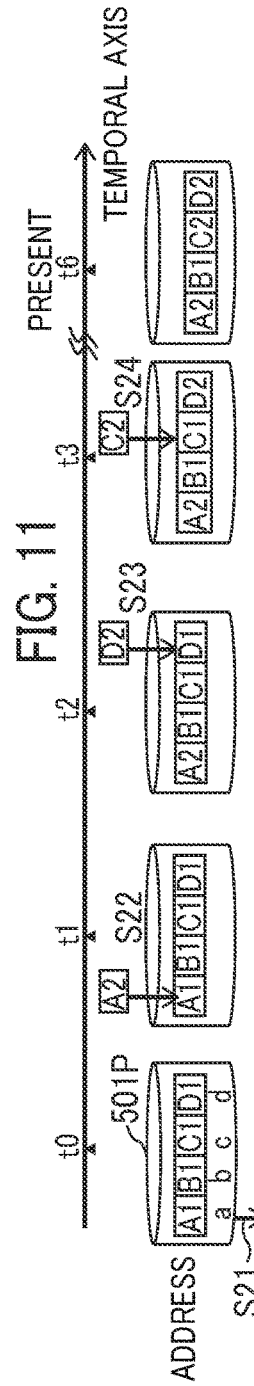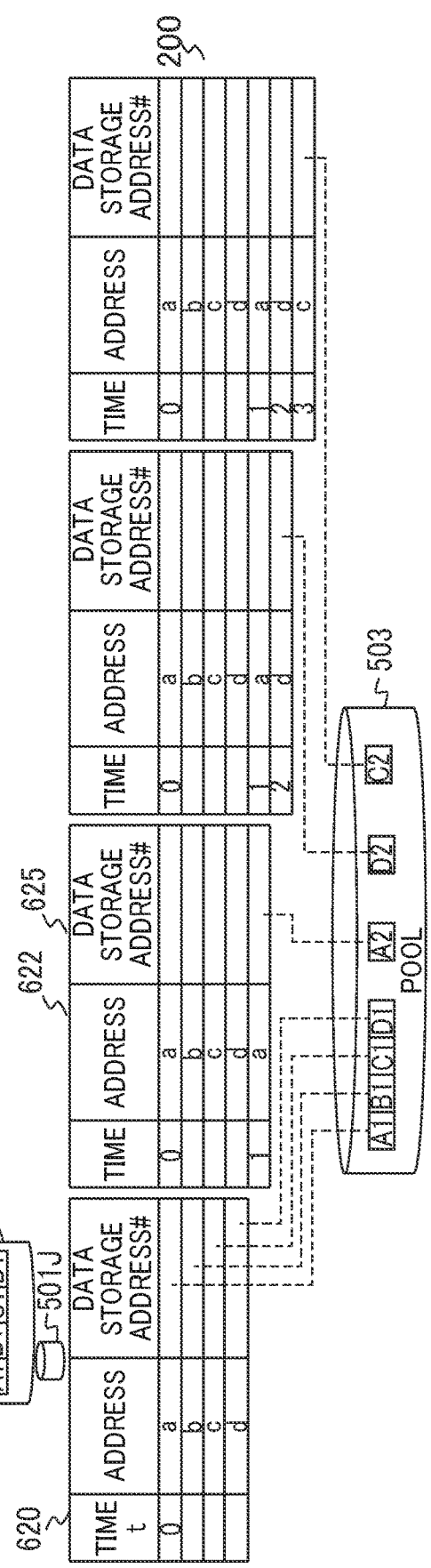

FIG. 13
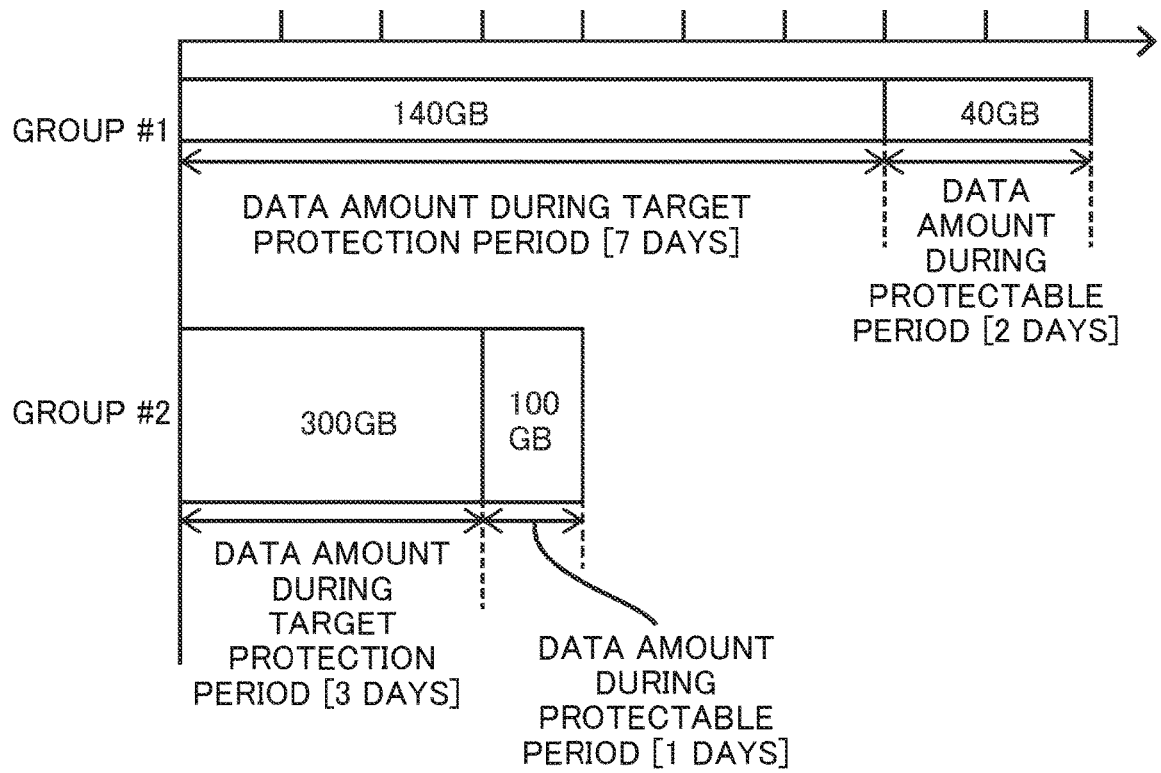
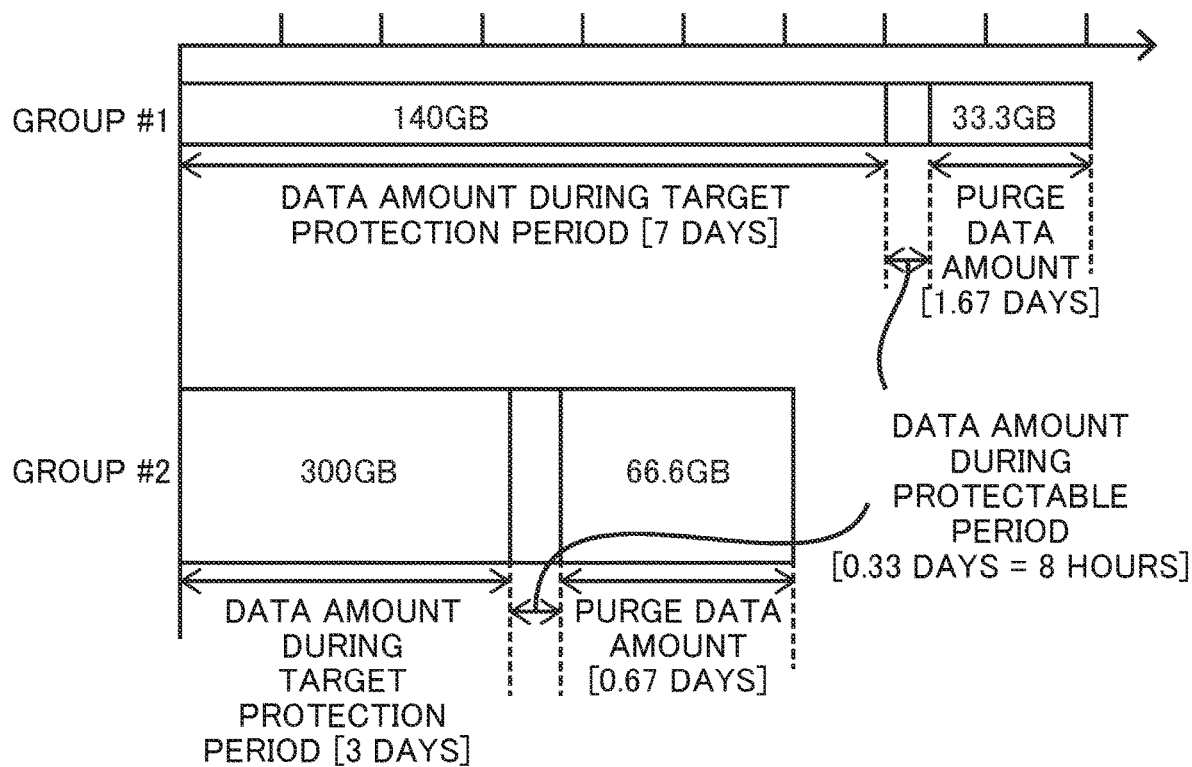

FIG. 21

ADDRESS TRANSLATION TABLE 422_1

| IN-VOL ADDRESS (911) | REFERENCE DESTINATION PAGE# (912) | REFERENCE VOL (913) | DATA SIZE (914) |
|---|---|---|---|
| 0 | 100 | 10 | 1 |
| 10 | 100 | 20 | 5 |
| 20 | 200 | 50 | 10 |
| ... | ... | ... | ... |

STORAGE SYSTEM AND HISTORY INFORMATION MANAGEMENT METHOD

BACKGROUND

The present invention relates to a storage system, and particularly to a history information management method of a storage system.

When data is lost due to failure occurrence in a storage system, human errors, and data falsification by ransomware or the like, etc., the storage system is required to be immediately restored to its normal state.

CDP (Continuous Data Protection) is a technique which enables recovery to any point (recovery point) in a specified past (refer to U.S. Pat. No. 8,046,549 (Patent Document 1)). In the CDP, data before being updated is saved in write processing to an actual volume in which business data is stored, and history information is continuously stored. When a failure or the like is detected, restore processing of specifying the recovery point to return to the saved data is executed. The history information is stored in a pool and purged from the old history to ensure a storage free space.

U.S. Pat. No. 8,046,549 has disclosed that a history exceeding a target protection period set to a journal group (logical volume group in which each history is managed by one journal volume) is written into a base volume to update storage contents of the base volume and is purged from the journal volume. The target protection period means a period during which storage contents of a volume to be protected can be returned to the past. The target protection period is set in advance like, for example, "3 hours". This is referred to as meta information, which includes as main elements, pre-update data, an update time, and an update data storage position (address information).

SUMMARY

In the CDP, the target protection period being a period during which the storage contents of a CDP-targeted volume can be returned to the past is set. The period is set in advance like, for example, "3 days" for each volume. Here, when a plurality of volumes are grouped and protected as a whole for the groups, restore control is performed in a group unit. All the volumes in the group are restored to the storage contents at the same time, and the resumption of business after the restoration is also executed simultaneously.

When the groups utilize one pool, it is necessary to determine from which group and how much capacity should be purged.

In U.S. Pat. No. 8,046,549 described above, however, a plurality of groups different in target protection period are not intended to enter one pool.

An object of the present invention is to provide a storage system and a history information management method capable of satisfying a target protection period by all groups and securing a required free capacity.

In order to achieve the above object, according to one aspect of a storage system of the present invention, the storage system includes a storage controller, plural volumes each comprised of the storage controller, and a pool constituted to allocate physical storage areas to logical storage areas of the volumes. The storage controller constitutes a first group including, among the volumes, at least one first primary volume to which a first target protection period is set, a first copying volume storing a copy of the first primary volume at a predetermined time, and a first history information volume storing history information about updating to the first primary volume, and a second group including, among the volumes, at least one second primary volume to which a second target protection period is set, a second copying volume storing a copy of the second primary volume at a predetermined time, and a second history information volume storing history information about updating to the second primary volume. The volumes included in the first group and the second group utilize the same physical storage area of the pool. When a free capacity of the pool is increased from a state in which the history information about the updating to the first primary volume, which is stored in the first history information volume is capable of providing the first target protection period and a first protectable period, and the history information about the updating to the second primary volume, which is stored in the second history information volume is capable of providing a second protectable period equivalent to a period longer than the second target protection period, history information to be purged is determined from the first protectable period and the second protectable period in such a manner that the first protectable period and the second protectable period are put in a predetermined relation.

According to the present invention, since a purge period is calculated in such a manner that the difference between a target protection period and an actual protection period becomes small in each group in a pool, the pool is avoided from filling up while equally leaving history information in protectable periods among the groups.

BRIEF DESCRIPTION OF THE DRAWINGS

FIG. 5 is a diagram showing an example of a VOL management table;

FIG. 6 is a diagram showing an example of an address translation table;

FIG. 7 is a diagram showing an example of a page allocation management table;

FIG. 8 is a diagram showing an example of a pool management table;

FIG. 10 is a diagram showing an example of a CDP group management table;

FIG. 11 is a diagram showing one example of the implementation of a CDP;

FIG. 13 is a diagram describing the way of thinking of the recovery of a pool capacity;

FIG. 21 is a diagram showing an example of another address translation table;

DETAILED DESCRIPTION

Figure 1:
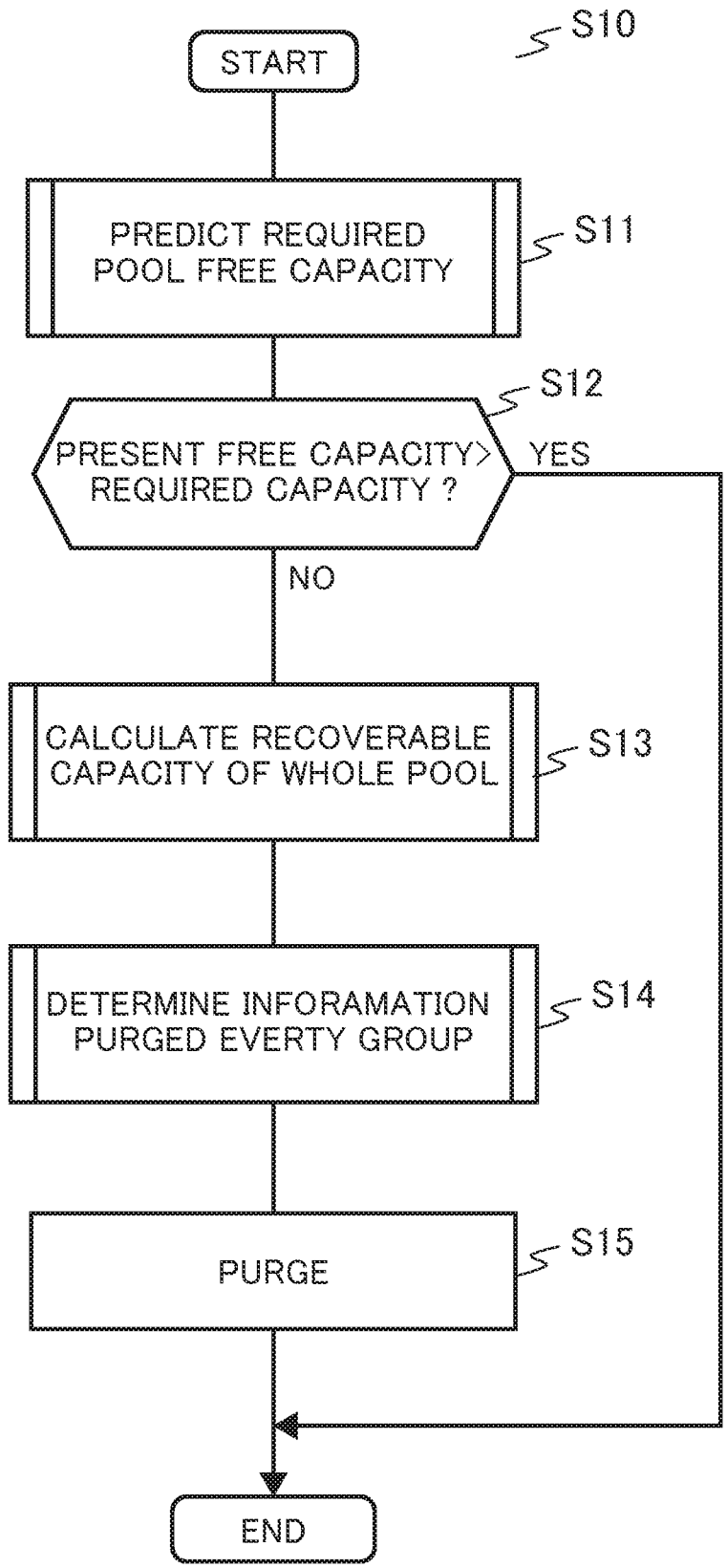
FIG. 1 is a flowchart showing an overview of a pool capacity recovery method.

In the following description, an "interface unit" may be one or more interfaces. The one or more interfaces may be one or more communication interface devices of the same type (e.g., one or more NICs (Network Interface Cards) or may be two or more communication interface devices (e.g., NIC and HBA (Host Bus Adapter)) of different types.

Also, in the following description, a "memory unit" is one or more memories, and may typically be a main storage device. At least one memory in the memory unit may be either a volatile memory or a nonvolatile memory.

Further, in the following description, a "PDEV unit" is one or more PDEVs, and may typically be an auxiliary storage device. The "PDEV" means a physical storage device (Physical storage DEVice), typically a nonvolatile storage device, e.g., an HDD (Hard Disk Drive) or an SSD (Solid State Drive). Alternatively, it may be a flash package.

The flash package is a storage device including a nonvolatile storage medium. A configuration example of the flash package has a controller and a flash memory being a storage medium for storing write data from a computer system. The controller includes a drive I/F, a processor, a memory, a flash I/F, and a logic circuit having a compression function. These are connected to one another through an internal network. The compression function may be omitted.

In addition, in the following description, a "storage unit" is at least one of the memory unit and the PDEV unit (typically at least memory unit).

Moreover, in the following description, a "processor unit" is one or more processors. At least one processor is typically a microprocessor like a CPU (Central Processing Unit), but may be other types of processors like a GPU (Graphic Processing Unit). At least one processor may be either a single core or a multi-core.

Additionally, at least one processor may be a broad processor like a hardware circuit (e.g., FPGA (Field-Programmable Gate Array) or an ASIC (Application Specific Integrated Circuit) which performs a part or all of processing.

Furthermore, in the following description, information by which an output is obtained with respect to an input may be described by an expression like an "xxx table", but such information may be data of any structure, or may be a learning model like a neural network which generates an output for an input. Accordingly, it can be said that the "xxx table" is "xxx information".

In addition, in the following description, the configuration of each table is an example, and one table may be divided into two or more tables, or all or part of two or more tables may be one table.

Moreover, in the following description, there may be a case in which processing is described with a "program" as a subject. However, the program is executed by a processor unit to perform predetermined processing while using a storage unit and/or an interface unit or the like as appropriate. The subject of the processing may therefore be defined as a processor unit (or a device like a controller having the processor unit).

The program may be installed in a device like a computer. The program may be placed in, for example, a program distribution server or a (e.g., non-transitory) recording medium readable by a computer. Further, in the following description, two or more programs may be executed as one program, or one program may be executed as two or more programs.

Additionally, in the following description, a "computer system" is a system including one or more physical computers. The physical computer may be either a general-purpose computer or a dedicated computer. The physical computer may function as a computer (called e.g., a host computer or a server system) which issues an I/O (Input/Output) request, or may function as a computer (e.g., a storage device) which performs I/O of data in response to the I/O request.

That is, the computer system may be at least one of one or more server systems each of which issues an I/O request, and a storage system being one or more storage devices each of which performs I/O of data in response to the I/O request. In at least one physical computer, one or more virtual computers (e.g., VM (Virtual Machine)) may be executed. The virtual computer may be a computer which issues an I/O request, or may be a computer which performs I/O of data in response to the I/O request.

Also, the computer system may be a distribution system constituted of one or more (typically plural) physical node devices. The physical node device is a physical computer.

Further, the physical computer (e.g., node device) may execute predetermined software to thereby construct SDx (Software-Defined anything) in the physical computer or the computer system including the physical computer. As SDx, for example, an SDS (Software Defined Storage) or an SDDC (Software-defined Datacenter) may be adopted.

By executing software having a storage function by a physical general-purpose computer, a storage system as the SDS may be constructed.

Further, as at least one physical computer (e.g., storage device), one or more virtual computers each functioning as a server system, and a virtual computer as a storage controller (typically, a device which performs the input/output of data to and from the PDEV unit in response to an I/O request) may be executed.

In other words, such at least one physical computer may have both a function as at least part of the server system and a function as at least part of the storage system.

In addition, the computer system may have a redundant configuration group. The redundant configuration may be a configuration by a plurality of node devices like Erasure Coding, RAIN (Redundant Array of Independent Nodes), and internode mirroring. The redundant configuration may be a configuration by a single computer (e.g., node device)

like one or more RAID (Redundant Array of Independent (or Inexpensive) Disks) groups as at least part of the PDEV unit.

Furthermore, in the following description, identification numbers are used as identification information for various objects, but identification information (e.g., identifiers including English letters and codes) of kinds other than the identification numbers may be adopted.

Additionally, in the following description, when elements of the same type are described without distinguishing therebetween, reference numerals (or common reference numerals of reference numerals) are used, whereas when the elements of the same type are described distinguishably, identification numbers (or reference numerals) of elements may be used.

For example, when "pages" each being a unit of a storage area are explained without distinguishing therebetween, the page is described as a "page 51". When the individual pages are explained distinguishably, they may be described by using the numbers of pages like a "page #0", and a "page #1 or may be described by using reference numerals like a "single page 51P", and a "common page 51C".

First Embodiment

<Overview of Operation>

A first embodiment will hereinafter be described with reference to the accompanying drawings.

An overview of a pool capacity recovery method according to the first embodiment will first be described.

FIG. 1 is a flowchart showing the overview of the pool capacity recovery method according to the first embodiment.

Processing is performed every pool. A free capacity of a pool required in the future is predicted and calculated referring to the present write processing number (S11). The present free capacity and the required free capacity calculated in S11 are compared (S12). The processing is ended if the present free capacity is sufficient. When the free capacity is insufficient, a pool capacity recoverable capacity is calculated (S13), history information to be purged for each group is determined (S14), and purge is executed (S15). Incidentally, S indicates a step.

S11 to S14 are executed by a pool capacity recovery program 413 to be described later, and S15 is executed by a read/write program 411.

<System Configuration>

Figure 2:
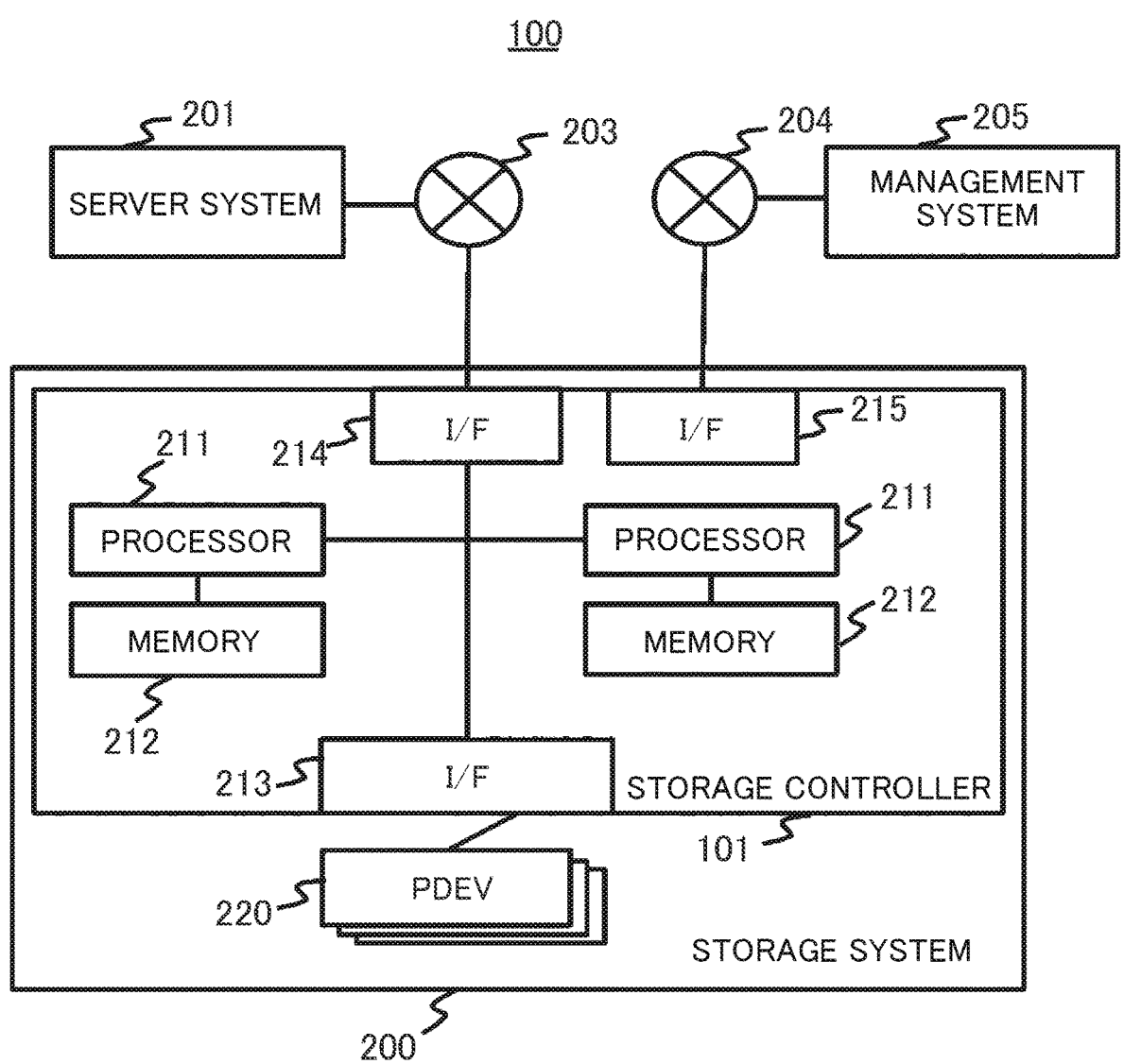
FIG. 2 is a diagram showing a configuration example of a system including a storage system.

A storage system 200 has a storage controller 101 as shown in FIG. 2. The storage controller 101 is an example of a controller including a processor unit 211. The storage controller 101 has a CDP function and a volume duplication function as a function of virtually copying a logical volume used in a CDP.

FIG. 2 is a diagram showing a configuration example of a system including the storage system 200. The storage system 200 has PDEVs 220 being a plurality of physical storage devices (or one physical storage device), and the storage controller 101 connected to the PDEVs 220.

The storage controller 101 has an I/F 214, an I/F 215, an I/F 213, memories 212, and processors 211 connected thereto. The I/F 214, the I/F 215, and the I/F 213 are an example of the interface unit. The memory 212 is an example of a storage unit. The processor 211 is an example of a processor unit.

The I/F 214 is a communication interface device which mediates the transfer of data between a server system 201 and the storage controller 101. The server system 201 is connected to the I/F 214 through an FC (Fibre Channel) network 203.

The server system 201 transmits an I/O request (write request or read request) which designates an I/O destination (e.g., a logical volume number like an LUN (Logical Unit Number), and a logical address like an LBA (Logical Block Address)) to the storage controller 101.

The I/F 215 is a communication interface device which mediates the transfer of data between a management system 205 and the storage controller 101. The management system 205 is connected to the I/F 215 through an IP (Internet Protocol) network 204.

The network 203 and the network 204 may be the same communication network. The management system 205 manages the storage system 200.

The I/F 213 is a communication interface device which mediates the transfer of data between the PDEVs 220 and the storage controller 101. The PDEVs 220 are connected to the I/F 213.

The memory 212 stores a program executed by the processor 211 and data used by the processor 211 therein. The processor 211 executes the program stored in the memory 212. For example, the pair of the memory 212 and the processor 211 is duplexed.

There are known several techniques of backing up the original data in preparation for the loss of data due to the occurrence of a failure, human errors, and data falsification due to ransomware or the like, etc.

As one of the backup techniques, there is known a CDP (Continuous Data Protection) technique of enabling the original data at an arbitrary time point to be restored during a certain limited period. In the present technique, when updating the original data, information (hereinafter called journal) indicative of a history related to the updating of the original data is acquired, and the journal is stored in a storage area (called, for example, a logical volume, or hereinafter called a journal volume "JVOL", or called a volume for history information to store history information related to the updating of a primary volume) different from a storage area (called a primary logical volume, hereinafter a primary volume "PVOL") in which the original data is stored. Further, the duplication (hereinafter called "base data") of the original data before the journal acquisition is created, and then it is stored in a storage area (e.g., a logical volume, hereinafter called a base volume "BVOL" or a copying volume for the purpose of storage of a copy of a primary volume) different from the storage area in which the original data or the journal is stored.

When a data restoration request having specified an arbitrary designated time is received, a journal acquired from a BVOL creation time (acquisition time of base data) to the designated time is reflected on BVOL, so that the original data at the designated time is restored within BVOL (i.e., the base data is updated to the original data at the designated time).

Although the embodiment is described below using the backup technique conforming to the CDP technique, in the present invention, the backup technique may be a method of restoring data, but is not necessarily required to be the backup technique conforming to the CDP technique. Although described using elements necessary for the CDP technique, this is not the essence of the present invention. For example, the existence of BVOL and JVOL is not essential. Information for returning to a certain time point in the past may be provided. For example, history information comprised of a write time, a write address, and write data in the past, and data stored in the present volume may be provided.

Figure 3:
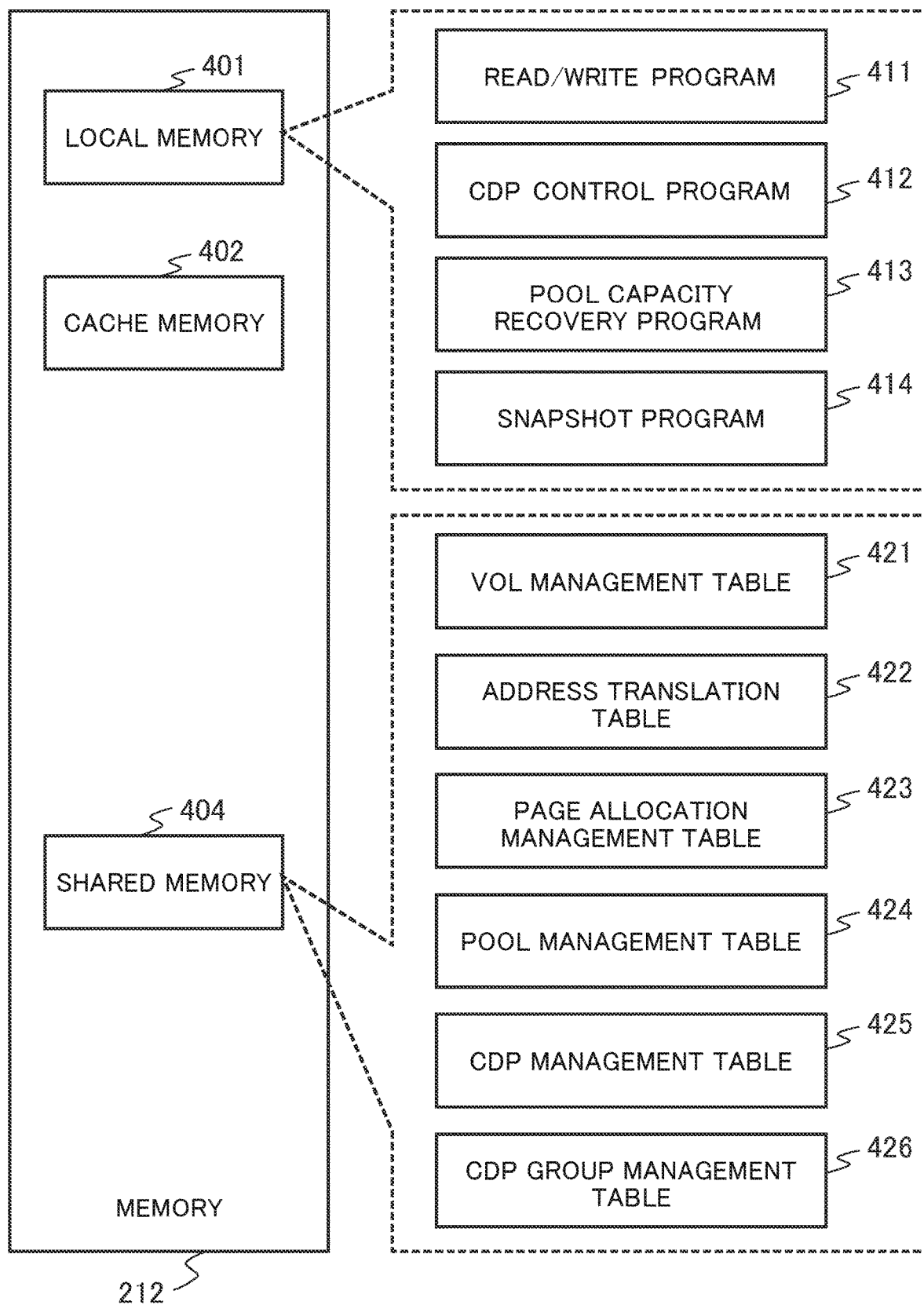
FIG. 3 is a diagram showing an example of both a configuration of a memory, and programs and management information in the memory.

FIG. 3 is a diagram showing an example of the configuration of the memory 212, and programs and management information in the memory 212. The memory 212 includes memory areas called a local memory 401, a cache memory 402, and a shared memory 404. At least one of these memory areas may be an independent memory. The local memory 401 is used by the processor 211 belonging to the same set as that for the memory 212 including the local memory 401.

A read/write program 411, a CDP control program 412, a pool capacity recovery program 413, and a snapshot program 414 are stored in the local memory 401. These programs will be described later.

A dataset to be written or read to and from the PDEV 220 is temporarily stored in the cache memory 402.

The shared memory 404 is used by both the processor 211 belonging to the same set as that for the memory 212 including the shared memory 404, and the processor 211 belonging to different sets. The management information is stored in the shared memory 404.

The management information includes a VOL management table 421, an address translation table 422, a page allocation management table 423, a pool management table 424, a CDP management table 425, and a CDP group management table 426.

<CDP Configuration>

Figure 4:
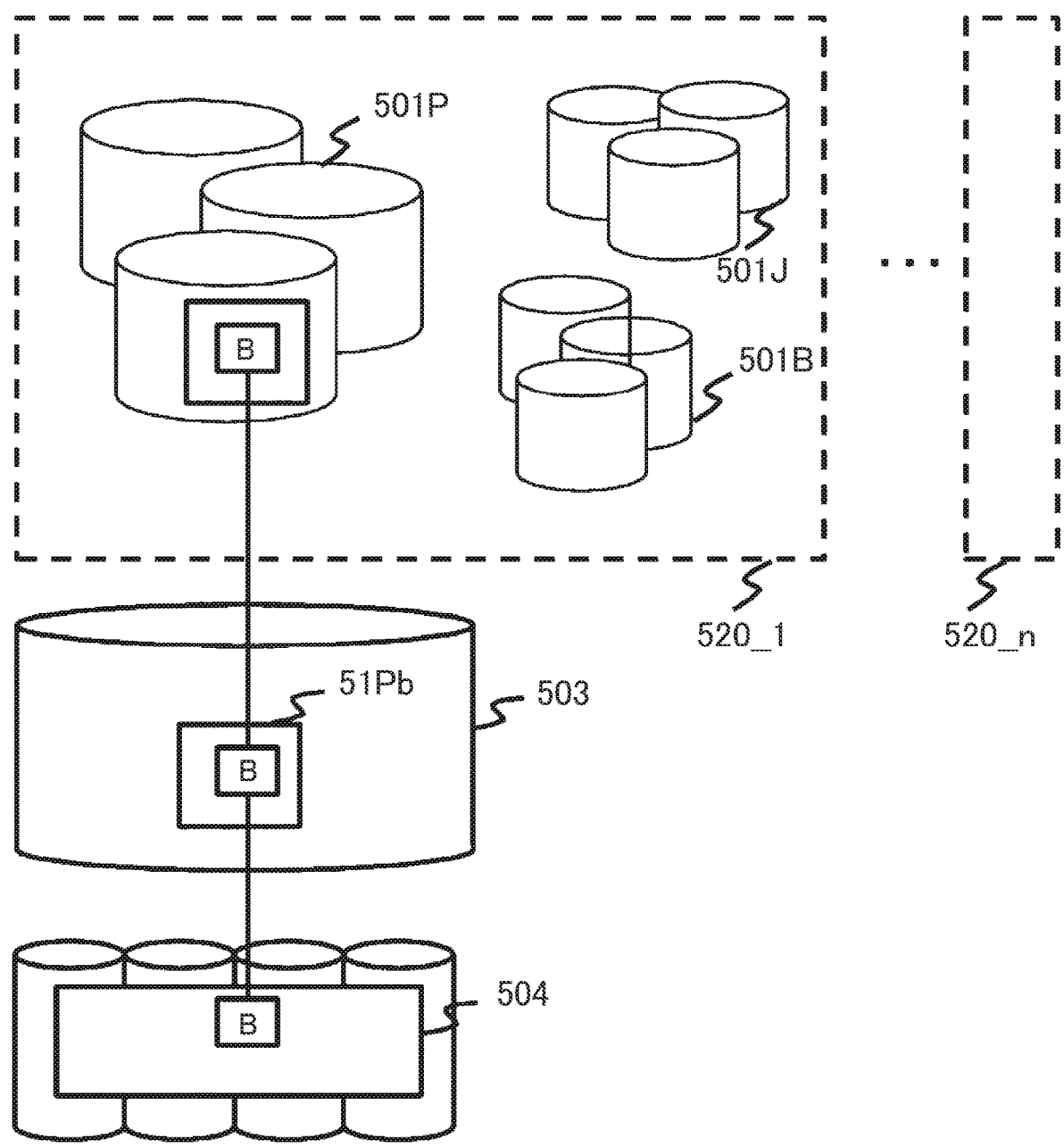
FIG. 4 is a diagram showing one example of a CDP configuration.

FIG. 4 is an explanatory diagram showing a CDP configuration in the storage system 200. A plurality of types of volumes 501P, 501B, and 501J are provided at least one or more within the storage system 200 by the CDP control program 412. These volumes 501P, 501B, and 501J are respectively generated by virtualizing the physical storage areas included in the PDEVs 220. The volume 501P uses the pool generated from the PDEV and allocates a page 51 being a physical storage area of a pool 503 to a page being a logical storage area of the volume 501P. Data is stored in a physical storage area mapped to a storage area unit B in the page 51. Although the CDP configuration is described below based on the volume, a partial area in the storage area may be adopted.

The volume 501P is a volume protected by a CDP function. The volume 501P is a PVOL volume (primary volume) in which its storage contents are continuously protected by journal data. The volume 501P is an actual volume used in business, which is connected to the server system 201 and stores therein data written from the server system 201. The server system 201 is capable of writing data into the volume 501P and reading the data from the volume 501P.

The volume 501B is a base volume BVOL, i.e., a copying volume to maintain the storage contents of the volume 501P at a predetermined time point in the past. The base volume BVOL is a volume which stores the storage contents prior to the latest storage contents of the PVOL. The difference in time between the storage contents of BVOL and PVOL is controlled so as to be constant at all times. It is however not necessarily required to be a fixed time. For example, when journal data are written into BVOL in order, they follow late from the storage contents of PVOL. As another method, there is known a method of retaking BVOL at a new time. There are also known a method of taking a copy of BVOL in full backup, and methods such as taking it in snapshot and clone.

The volume 501J is a journal volume JVOL for storing journal data generated upon updating of the volume 501P, and is a volume for history information, which stores history information therein. The journal data is data for managing a history in which PVOL is updated by the server system 201.

In the first embodiment, one or a plurality of volumes 501P can be protected as CDP targets. That is, only one volume 501P can be protected alone, or a plurality of volumes 501P can also be grouped by a CDP group 520_$n$ and protected as a whole for the groups. For example, a plurality of volumes 501P that store data related to each other can be grouped, and protection operations by CDP can be synchronized. That is, the group is constituted of data, volumes, or a volume group equally set in terms of a protection period, and for example, in the CDP group 520_$n$ shown in FIG. 4, it is constituted of one or a plurality of volumes 501P, one or a plurality of journal volumes 501J, or one or a plurality of base volumes.

The base volume BVOL is associated with PVOL on a one-to-one basis. On the other hand, one journal volume 501J can be associated with a plurality of volumes 501P respectively.

When a plurality of volumes 501P are grouped as a CDP group, they can be recovered by either of two methods. The first method is a method of executing restore control in a group unit. In the first method, all the volumes 501P in the CDP group are controlled in synchronism with each other so that respective protection periods respectively coincide with each other. The second method is a method of executing restore control in a volume unit. In the second method, the respective primary volumes 501P in the CDP group respectively individually executes restore processing. In the present invention, the restore control by the first method is executed.

<Management Information>

A description will next be made as to an example of each table being management information.

FIG. 5 is a diagram showing an example of the VOL management table 421. Logical volumes provided to the server system 201 as in the volume 501P, and logical volumes which are not provided to the server system 201 as in the base volume 501B and the journal volume 501J may also be collectively called "VOL".

The VOL management table 421 holds information related to VOL. For example, the VOL management table 421 has entries every VOL. Each entry stores therein information such as a VOL #801, a VOL capacity 802, a pool #803, and a group #804. The VOL management table will be described below by taking for example one VOL (called "target VOL").

The VOL #801 is information about the number (identification number) of the target VOL. The VOL capacity 802 is information about the capacity of the target VOL. The pool #803 is information about the number of the pool 503 associated with the target VOL. The group #804 is a CDP group number (identification number) to which the target volume belongs. Although only PVOL is registered here, all VOLs may be managed by providing VOL attribute information and holding information about the attribute of the target VOL, for example, as in the case where the base volume is defined to be "base", and the journal volume is defined to be "journal".

FIG. 6 is a diagram showing an example of the address translation table 422. The address translation table 422 is set every volume 501. The address translation table 422 holds information about the relationship between a logical address (in-VOL address) as a reference source and a logical address as a reference destination.

For example, the address translation table 422 has entries every page or block. Each entry stores therein information such as an in-VOL address 901, a reference destination page

902, and a data size 903. The address translation table 422 will be described below by taking for example one block 601 (called "target block").

The in-VOL address 901 is information of a logical address (e.g., head logical address) of each target block in the volume 501. The reference destination page #902 is information of a logical address (reference destination in-pool logical address) corresponding to the logical address of each target block in a page of a reference destination pool of the target block. The data size 903 is information about the size of the target block.

FIG. 7 is a diagram showing an example of the page allocation management table 423. The page allocation management table 423 is set every pool 503. The page allocation management table 423 retains information related to the relationship between the page 51 and its allocation destination. For example, the page allocation management table 423 has entries every page 51.

Each entry stores therein information such as a page #1201, an allocation flag 1202, an allocation destination VOL #1203, and an allocation destination in-VOL address 1204. The page allocation management table will be described below by taking for example one page 51 (called "target page"). The page #1201 is information about the number of the target page. The allocation flag 1202 is information indicative of whether the target page is allocated ("allocated") or not allocated ("unallocated").

The allocation destination VOL #1203 is information about the number of the allocation destination VOL (volume 501) of the target page. The allocation destination in-VOL address 1204 is information of a logical address (e.g., head logical address) in an area at the allocation destination VOL of the target page.

FIG. 8 is a diagram showing an example of the pool management table 424. The pool management table 424 is a table which holds information related to the pool 503.

The pool management table 424 stores therein every pool 503, information such as a pool #1101, a capacity 1102, a free capacity 1103, a group #1104, and a write request frequency 1105. The pool #1101 is information to identify a target pool 503, e.g., a pool number or the like. The capacity 1102 is a total capacity of a pool to be targeted. The free capacity 1103 is a usable capacity of the capacity 1102. It is a value obtained by deleting the total capacity of each allocated page in the pool capacity from the capacity of the pool. The group #1104 indicates information of a CDP group number which belongs to the pool. The write request frequency 1105 is a value obtained by converting a processed number of write request numbers to the pool to per unit time.

Figure 9:
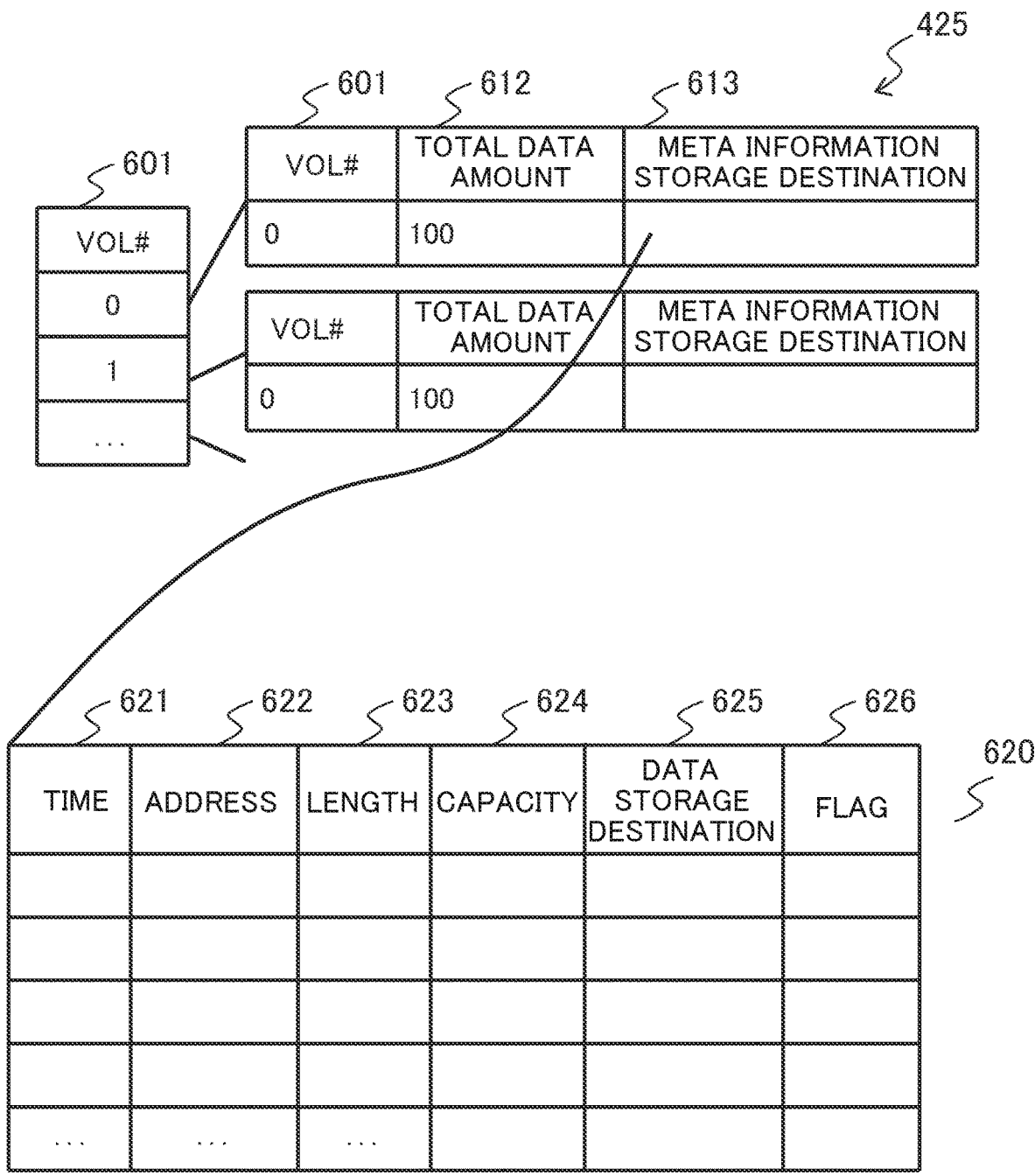
FIG. 9 is a diagram showing an example of a CDP management table.

FIG. 9 is a diagram showing an example of the CDP management table 425. The CDP management table 425 of FIG. 9 is an explanatory diagram typically showing a storage configuration of the journal volume 501J. Data for managing journal data, and a data body of the journal data are stored in the storage area of the journal volume 501J.

As to the CDP management table 425, a volume number at which journal data of each volume (PVOL) is stored is registered in a VOL #601. The management data for the journal data may include a volume number 601 ("VOL" in the drawing), a data total amount 612, a meta information storage destination 613, etc.

The volume number 601 is information for specifying the volume 501P. The data total amount 612 stores therein a full capacity of data amounts pointed to a data storage destination 625 of meta information 620 connected to the meta information storage destination 613. The meta information storage destination 613 stores a head address of the meta information 620 therein.

The meta information 620 may include a time 621, an address 622, a length 623, a capacity 624, a data storage destination address 625, a flag 626, etc.

The time 621 is information about a time at which a write request occurs in the volume 501P. The address 622 is a logical block address (LBA) indicative of the head of write data written into the volume 501P. The length 623 is information indicative of a data size of the write data. The capacity 624 is a capacity of write data to be written. The data storage destination 625 is an address indicative of a storage position of the data body on the pool. The flag 626 is control information for indicating whether the journal data is treated as effective or ineffective.

FIG. 10 is a diagram showing an example of the CDP group management table 426. The CDP group management table 426 holds information in the CDP group and has the same every pool.

The CDP group is set to a volume to which the same target protection period is set, of a plurality of volumes. For example, data used in a certain application is stored in one or more volumes. Thus, the CDP group as the minimum unit of the data volume in which journaling is guaranteed is set. The group can be set up from one or more VOLs as VOL to which CDP is applied.

For example, a group number 701 is information about the number of a target CDP group. A VOL #702 is information of VOL # of PVOL belonging to the target CDP group. A target protection period 703 is information about a target protection period for all volumes belonging to the CDP group. The target protection period means a period during which the storage contents of the volume to be protected can be returned to the past. The target protection period is set in advance like, for example, "3 hours".

The CDP group management table 426 has monitor information. The monitor information is also provided every group and stores therein data for calculating a write-in data amount per unit time of the pool.

For example, the number of times of writing 704 is the number of times in which the volume of VOL #702 (PVOL) belonging to the group number 701 performs write processing on the pool in response to the write request. The write-in data amount 705 is an amount of data written when the write processing is performed. A monitor start time 706 is the time to start the monitoring of a write request number of times, and a write-in data amount. A monitor end time 707 is the time when the monitor is ended. The average number of writing times can be calculated by the number of writing times 704/(monitor end time-monitor start time).

The write request frequency (write-in data amount per unit time) 1105 shown in FIG. 8 indicates a result of monitoring of a write request from the server system 201 to PVOL. Referring to a write request in a monitor period set in advance, data sizes of the write frequency and write request are calculated and registered. The preset monitor period is from the present time to the previous day, and the like, for example. The write request frequency 1105 is recalculated every few hours or the like, for example, to appropriately rewrite data. The write request frequency 1105 may store data in a plurality of monitor periods therein. In the write request frequency 1105, the management system 205 may calculate the data sizes of the write frequency and the write request and register the same in a memory therein.

The write request frequency 1105 is calculated by referring to the CDP group belonging to the pool from the group

1104 and using values calculated from the number of times of writing 704 and the write-in data amount 705 at the group number 701 corresponding to the referenced group #. Write-in data amounts per unit time for all groups belonging to the pool are calculated, and the value averaged between the groups is registered in the write request frequency 1105 as a write-in data amount per unit time of the pool.

Thus far is the explanation of each table.

<Backup Operation Using CDP Technique>

A description will be made here as to the backup using the CDP technique by way of example in FIG. 11. One example of the CDP operation during normal operation will be described. First, a user specifies a volume 501P to be protected and a target protection period. The storage controller 101 copies all data stored in the volume 501P to a base volume 501B. For example, assuming that data at 9 o'clock is copied to a base volume 501B, it is shown that the CDP start time is 9 o'clock.

The server system 201 accesses the volume 501P to read/write data. When the write data transmitted from the server system 201 is written into the volume 501P, that is, when a write request targeting the volume 501P is issued from the server system 201, the storage controller 101 generates journal data (meta information) 620 on the basis of the write request. The generated journal data 620 is stored in the journal volume 501J. The write data is written into the volume 501P.

Incidentally, the sever system 201 may write data in the volume 501P in the middle of copying the storage contents of the volume 501P at a certain time point to the base volume 501B. A description will be made as to the case in which the server system 201 requests new writing of data with respect to an uncopied area in which the copying of the storage contents from the volume 501P to the base volume 501B is not completed.

In this case, as one example, the storage controller 101 copies data (old data) stored in the uncopied area from the volume 501P to the base volume 501B, and thereafter writes new data from the server system 201 into the volume 501P.

As another example, there is also known a method of attaching the attribute like "new data" to write data for a new write request issued while copying from the volume 501P to the base volume 501B to manage it on the cache memory and to manage it separately from the old data stored in the uncopied area. In this example, the copying of the old data from the volume 501P to the base volume 501B and processing (overwriting of new data) of the write request from the server system 201 can be performed asynchronously. Incidentally, there is also known a further method.

The position where the volume 501P is updated by the server system 201 is stored in a difference bit map in charge of a period (section) including the time of issuance of the write request. The update position can be managed in a predetermined size unit set in advance like, for example, a slot unit, a block unit or the like.

When time elapses and the period in charge of the first difference bit map has passed, the storage controller 101 switches it to another new different bit map to manage the position where the volume 501P is updated by the server system 201.

When a target protection period elapses from the CDP start time, journal data 620 in which the target protection period has elapsed are written into the base volume 501B in order. That is, when the present time passes 12 o'clock, journal data generated earlier than the present time (12 o'clock) by a target protection period (3 hours) are written into the base volume 501B in their generated order. The journal data 620 written into the base volume 501B is discarded.

<Restore Operation>

A description will be made as to an operation at the time of restoring. For example, there is a possibility that an error will occur in the storage contents of the volume 501P due to a failure generated in the application program on the server system 201, a wrong operation of the user, etc.

When the error has occurred in the storage contents of the volume 501P, the user issues an instruction for restoring the storage contents of the volume 501P up to a desired point of time. The user is capable of selecting an arbitrary time in the protection period as a restoring point (restore point).

When a data restore request having specified an arbitrary designated time is received, journals acquired from a BVOL creating time (acquisition time of base data) to the designated time are successively reflected on BVOL, whereby the original data at the designated time is restored within BVOL (i.e., the base data is updated to the original data at the designated time).

Further, there is a possibility that data falsification will occur due to ransomware or the like. If it is possible to specify the falsified time, the falsified time is selected and restored as a restoration point. If it is not possible to specify the falsified time, the time when the write request is made, which is closest to the present time at which it is possible to confirm that data is normal is selected and restored as a restoration point.

<Another CDP Operation>

A description will be made as to another example of the CDP operation at the normal operation. First, the user specifies a volume 501P to be protected and a target protection period. The storage controller 101 copies all data stored in the volume 501P to the base volume 501B.

When the write data transmitted from the server system 201 is written into the volume 501P, that is, when a write request targeting the volume 501P is issued from the server system 201, the storage controller 101 generates journal data (meta information) 620 on the basis of the data (old data) already stored in an address of the volume 501P in which the write request is made. The generated journal data 620 is stored in the journal volume 501J. After the journal data 620 is registered, data to which the write request is made is written into the volume 501P.

Incidentally, the sever system 201 may write data in the volume 501P in the middle of copying the storage contents of the volume 501P at a certain time point to the base volume 501B. A description will be made as to the case in which the server system 201 requests new writing of data with respect to an uncopied area in which the copying of the storage contents from the volume 501P to the base volume 501B is not completed.

<CDP Configuration>

FIG. 11 is one example of the CDP configuration. In the present example, when a write request targeting the volume 501P is issued from the server system 201, the storage controller 101 generates journal data (meta information) 620 on the basis of the write request. The generated journal data 620 is stored in the journal volume 501J.

In the CDP-targeted volume 501P, data A1 is stored in an address a in the volume, data B1 is stored in an address b, data C1 is stored in an address c, and data D1 is stored in an address d. These are all write data transmitted from the server system 201. A time t at which they are transmitted is 0. Since the volume 501P is a virtual volume, the data A1, B1, C1, and D1 are actually stored in the pool 503.

The meta information 620 of FIG. 11 indicates a part of table information in the meta information 620 of FIG. 9. In the meta information 620, 0 is stored at the time t621, a, b, c, and d are respectively stored in the address 622 being the data storage place of the volume 501P, and actual address information at a data storage destination is stored in the data storage destination (data storage address #) 625. The address stored in the data storage destination 625 is a storage destination of data on the pool.

A snapshot for the volume 501P is acquired to generate a base volume 501B (S21). The base volume is also a virtual volume, and actual data is stored in the pool.

At a time t1, a write request to the address a of the volume 501P is received from the server system 201. Write data A2 is overwritten on old data A1 (S22). A journal is added to the meta information 620. The data A2 is stored in a new place of the pool. Thus, it is possible to manage a history in which the data A1 has been written before the data A2.

At a time t2, a write request to the address d in the volume 501P is received from the server system 201. Write data D2 is overwritten on old data D1 (S23). A journal is added to the meta information 620.

At a time t3, a write request to the address c in the volume 501P is received from the sever system 201. Write data C2 is overwritten on old data C1 (S24). A journal is added to the meta information 620.

In the restore operation, for example, since the volume 501B is in a state at a point of time t0 when it is desired to restore the volume 501P at a point of time t1, a write request received during a period from the times t0 to t1 is taken as a target for the volume 501B. Specifically, processing of writing data stored in the address on the pool, which is stored in the data storage address 625 of the meta information 620 is executed in order from the time t0 to the time t1 in terms of a time t622 of the meta information 620 in the volume 501P. Data in a faulty part of the volume 501P is restored by copying from a volume B. Of the faulty data in the volume 501P, a self-restorable one is restored.

FIGS. 12A to 12D are diagram each showing the manner of changes in data amount of a write history in a volume targeted for CDP. The write data is stored in the address of the pool pointed within the meta information 620. The data amount of the write history in the volume is a total capacity of write data from the past time to the present time.

A data amount 510n[i] is the sum of the amounts of write data stored in the pool by write processing received at a time n of VOL #i. A data amount 510n−1[i] is the sum of the amounts of data stored in the pool by write processing at a time n−1. The time n−1 is past than the time n, and a time n+1 is a time closer to the present time than the time n.

Figure 12A:
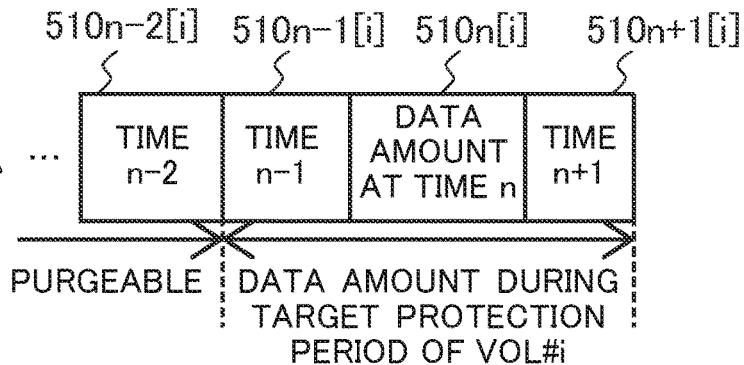
FIGS. 12A to 12D are diagrams each showing the manner in which a data amount of a write history of a volume targeted for the CDP changes.

FIG. 12A: Present time is time n+1

Assume that the target protection period of VOL #i is 3 days, and n=1 day unit, a data amount of the target protection period of VOL #i is a total value of data amounts 510 from time information n−1 to the time n+1, Since data at a time n−2 is past history data in which the target protection period of VOL #i has elapsed, it becomes unnecessary information at a timing in which the time n+1 is reached. History data before the time n−2 is purgeable at a point of time n+1. Since the data included during the target protection period is always retained in CDP, and the target protection period also changes as the time changes, data to be protected also changes. For example, when the target protection period is specified as a week, data corresponding to one week are retained so as to be returnable to any point in time before one week. As shown in this figure, when the present time proceeds from the time n to the time n+1, the time n−2 passes the target protection period, and hence the data at the time n−2 is purged to enable the pool to be set to a free capacity.

Figure 12B:
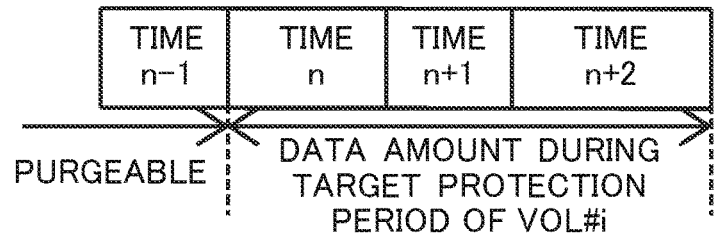

FIG. 12B: Present time is n+2

When the present time proceeds from the time n+1 to the time n+2, history data before the time n−1 becomes history data enabling the pool to be free in capacity by purging.

Figure 12C:
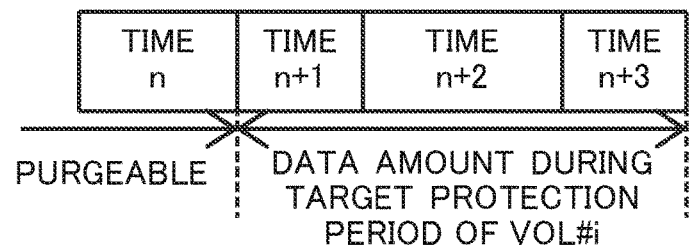

FIG. 12C: Present time is n+3

When the present time proceeds from the time n+2 to a time n+3, history data before the time n becomes history data enabling the pool to be free in capacity by purging.

Figure 12D:
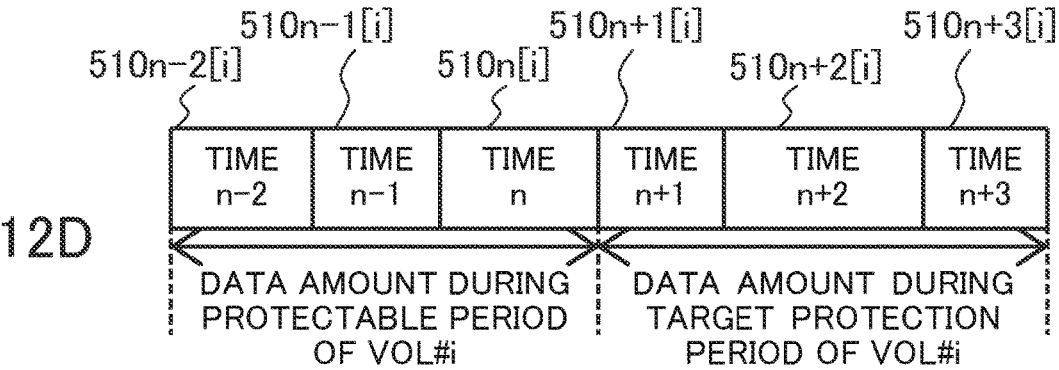

However, when it is predicted that the free capacity of the pool is sufficiently large, and the pool is not exhausted soon (there is room for the capacity of the pool), the data at the time prior to the target protection period can also be retained as it is. It is thus possible to provide the state before that during the target protection period to the user. A period prior to the target protection period is called a "protectable period". The protectable period is shown in FIG. 12D. The protectable period is not a period to assure the user protection, but indicates that the protection is possible if history information remains.

FIG. 13 shows a diagram describing the way of thinking of the recovery of a pool capacity. There are a CDP group #1 and a CDP group #2 which belong to a certain pool. The CDP group may be called simply a group. In order to prevent the free capacity of the pool from running short, the free capacity required to be secured as the free capacity of the pool is assumed to be 100 GB. That is, the free capacity of the pool can be increased by 100 GB.

In the group #1, the target protection period is 7 days. A total data amount corresponding to the past 7 days from the present time is 140 GB. Data prior to 7 days ago has a total data amount 40 GB corresponding to a protectable period as 2 days. In the group #2, the target protection period is 3 days. A total data amount corresponding to the past 3 days from the present time is 300 GB. Data prior to 3 days ago has a total data amount 100 GB corresponding to a protectable period as one day.

The total of the data amounts during the protectable periods of the group #1 and the group #2 which belong to the same pool is 40 GB+100 GB=140 GB. Of the data amount of 140 GB, 100 GB is purged to ensure a required free capacity. In terms of the ratio of amounts to be purged between the group #1 and the group #2 from within 140 GB, the data amount to be left is determined such that the post-purge protectable periods become the same. In the example of FIG. 13, a data amount to be purged in the group #1 is 33.3 GB, and a data amount to be left during the protectable period in the group #1 is 6.67 GB corresponding to 8 hours. A data amount to be purged in the group #2 is 66.7 GB, and a data amount to be left during the protectable period in the group #2 is 33.3 GB corresponding to 8 hours. Incidentally, it is also possible to make a predetermined relation without making the post-purge protectable periods identical to each other. The predetermined relation is, for example, the importance of data, a ratio (important data is twice the normal data) based on the SLA (Service Level Agreement), or a relation (protectable period is also set to the length of 7:3) proportional to the target protection period. Further, such a predetermined relation as to be determined by the data amount in the protectable period rather than by the length of the protectable period may be set.

As described above, even when a plurality of groups different in target protection period exist in the same pool, it is possible to keep the protection period for as long as possible while avoiding a full pool. When the groups exist in the same pool, it is difficult to determine from which group and how much the capacity should be purged. Even if the target protection period is purged to be satisfied over all groups, it is necessary to consider even the case where it is not possible to sufficiently ensure the space of the pool. Determining the purge amount in which the target protection period of each group is taken into consideration enables the target protection period to be kept equally among the groups. Even in the case where the target protection period cannot be held, each group determines the amount to be purged equally among the groups such that a shortened period of the target protection period becomes uniform.

<Operation Flow>

Figure 14:
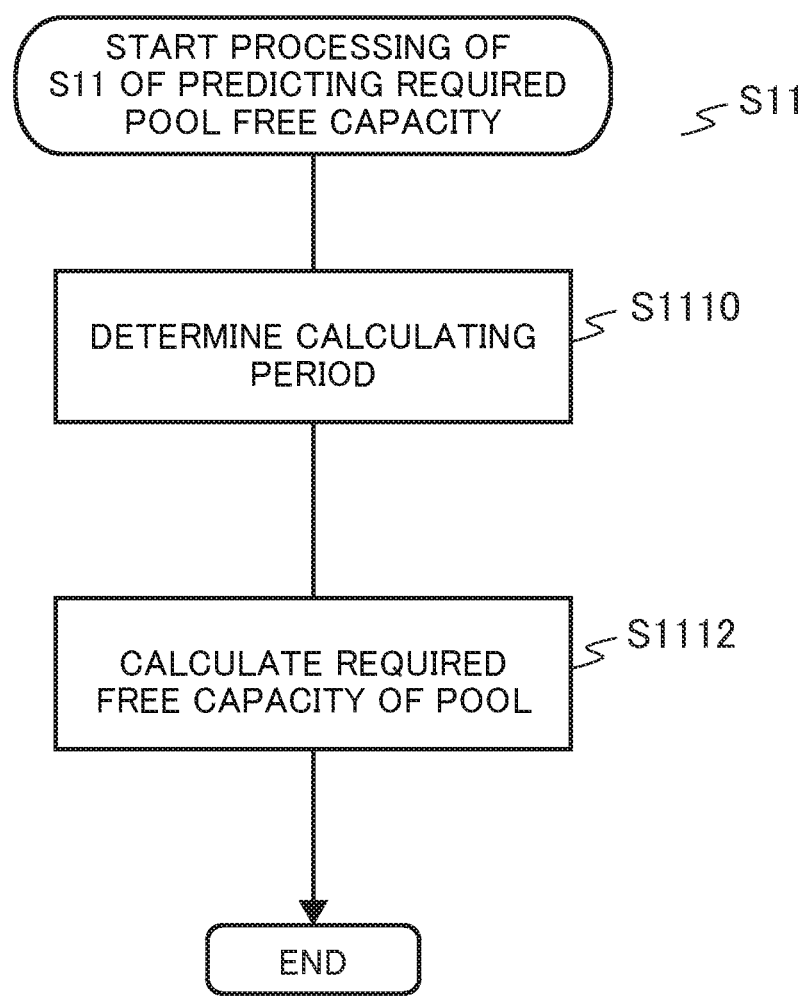
FIG. 14 is a flowchart showing processing of predicting and calculating a required capacity of pool.

FIG. 14 is a flowchart showing detailed processing of S11 in FIG. 1. This is processing of predicting and calculating the required capacity of pool. The present processing is executed every pool.

The storage controller 101 executes the pool capacity recovery program 413. First, the storage controller 101 determines a period to predict a required pool capacity. For example, a free capacity corresponding to three days from the present time is calculated (S1110). The storage controller 101 refers to a write required frequency (write-in data amount per unit time) 1105. When the write-in data amount 1105 is a write-in data amount in the unit of one day, the write-in data amount is set to three times to calculate the capacity of the pool requiring 3 days (S1112).

The write-in data amount per unit time may be acquired every group or pool volume.

The required free capacity calculated in S1110, and the present free capacity are compared (S12). When the present free capacity is larger than the required free capacity, the free capacity is determined as has already been sufficiently ensured, thereby to end the processing. When the required free capacity is insufficient, the processing proceeds to processing of S13 to ensure a free capacity. Specifically, a part of data in the protectable period is discarded (purged) to increase the free capacity. As the insufficiency of the required free capacity, the capacity to be purged can be calculated by subtracting the present free capacity from the required free capacity.

Further, as another embodiment, if, when PDEV is a flash medium, the total amount of garbage in the pool is determined, and the required free capacity calculated in S1110 and the total amount of garbage are compared with each other to set the garbage as a free capacity, a garbage collection may be executed where the free capacity is sufficient. Upon the garbage collection, the time taken to execute the garbage collection is taken into consideration, and the garbage collection is selected if the time taken for the garbage collection and the purge time are a predetermined threshold value or less. Incidentally, the free capacity becomes garbage after purging in the case of the flash medium, and the garbage can be used as a free area when the garbage collection is completed.

In order to predict a write-in data amount per unit time, the frequency of receiving a write request and a write data size (capacity) of the write request are monitored. The monitoring is performed every group in the pool. As an example, the monitoring is performed every volume, and a write request frequency of the group may be calculated from the result of execution of monitoring of all volumes which belongs to the group. This may be performed in a storage unit smaller than the volume by way of example.

A monitor time zone is specified when the monitoring is executed. Alternatively, the storage system always performs monitoring while the CDP function is being operated to count a write request number during a predetermined monitor period between the monitor start time and the monitor end time. When the monitor end time is reached, the storage system monitors the setting of the monitor end time to the monitor start time during a new period and continues monitor processing.

Figure 15:
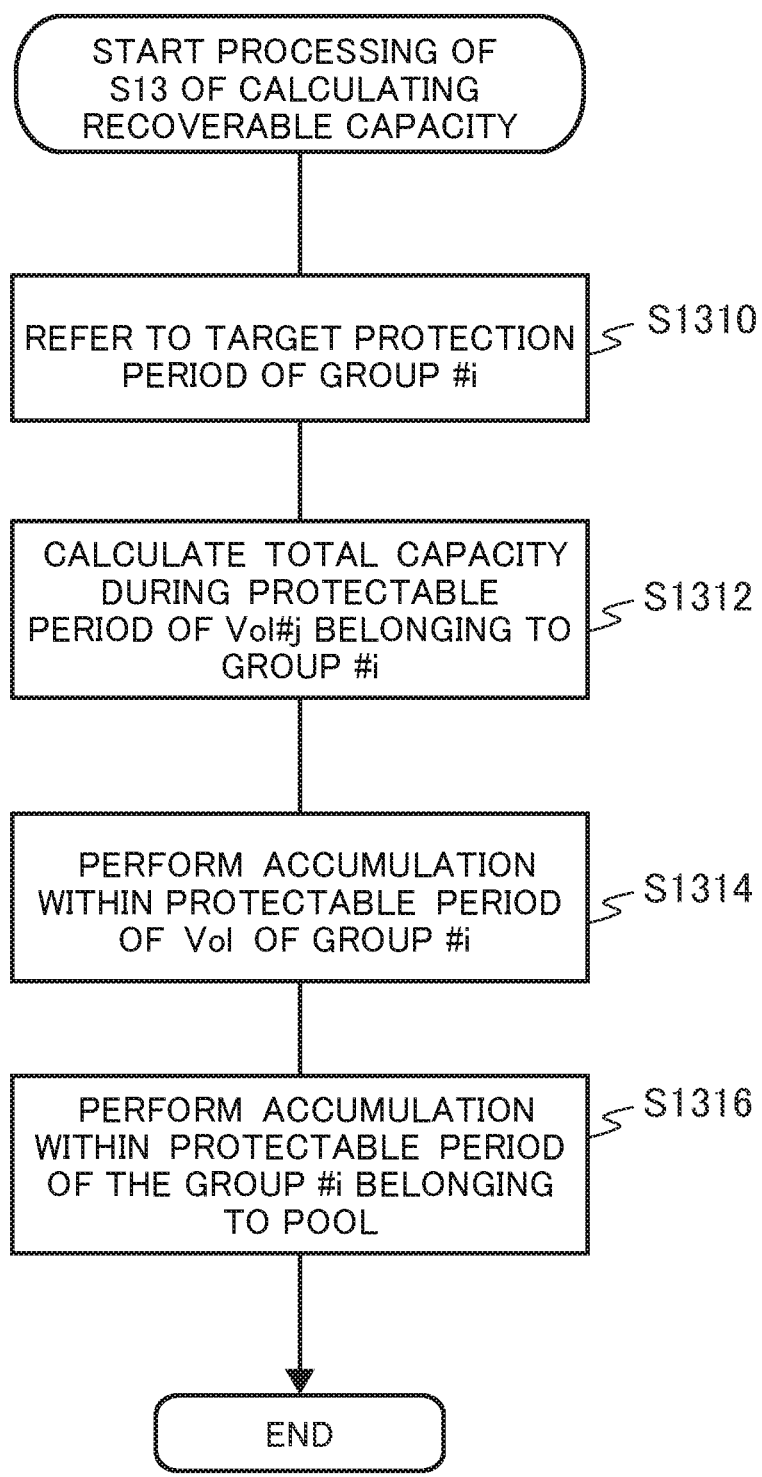
FIG. 15 is a flowchart showing processing of calculating a write-in data amount during a protectable period.

FIG. 15 shows the processing of S13 in FIG. 1 and is processing of calculating a recoverable capacity over the whole pool. That is, of the write data stored in the pool, the capacity of the whole data written during a protectable period exceeding a target protection period is calculated.

The storage controller 101 executes the pool capacity recovery program 413. Referring to the pool management table 424 shown in FIG. 8, the storage controller acquires a corresponding group number from each pool number. The storage controller refers to the target protection period 703 of a group using the pool, i.e., a group targeted for the group number 701 from the CDP group management table 426 having each acquired group number, which is shown in FIG. 10 (S1310). In terms of the capacity, the storage controller calculates the total capacity during a protectable period of Vol #j belonging to a group #i by referring to the time 621 of the meta information 620 of the volume belonging to each group in the pool, that is, the storage controller extracts meta information having the times earlier than the times in the target protection period 703 and adds up the capacities 624 being data amounts of meta information (S1312).

Next, the storage controller makes an accumulative total of Vol in the group #i within the protectable period, i.e., performs its accumulation every volume to calculate the total capacity of data amounts during the protectable period in each group (S1314). Next, the accumulative total within the protectable period of the group #i belonging to the pool, i.e., the total capacities of data amounts during the protectable period in all groups using the pool are added up to calculate the capacity other than during the target protection period in the pool (S1316).

The capacity in the protectable period is calculated at fixed time intervals, and a result of calculation thereof may be retained in the table.

Figure 16:
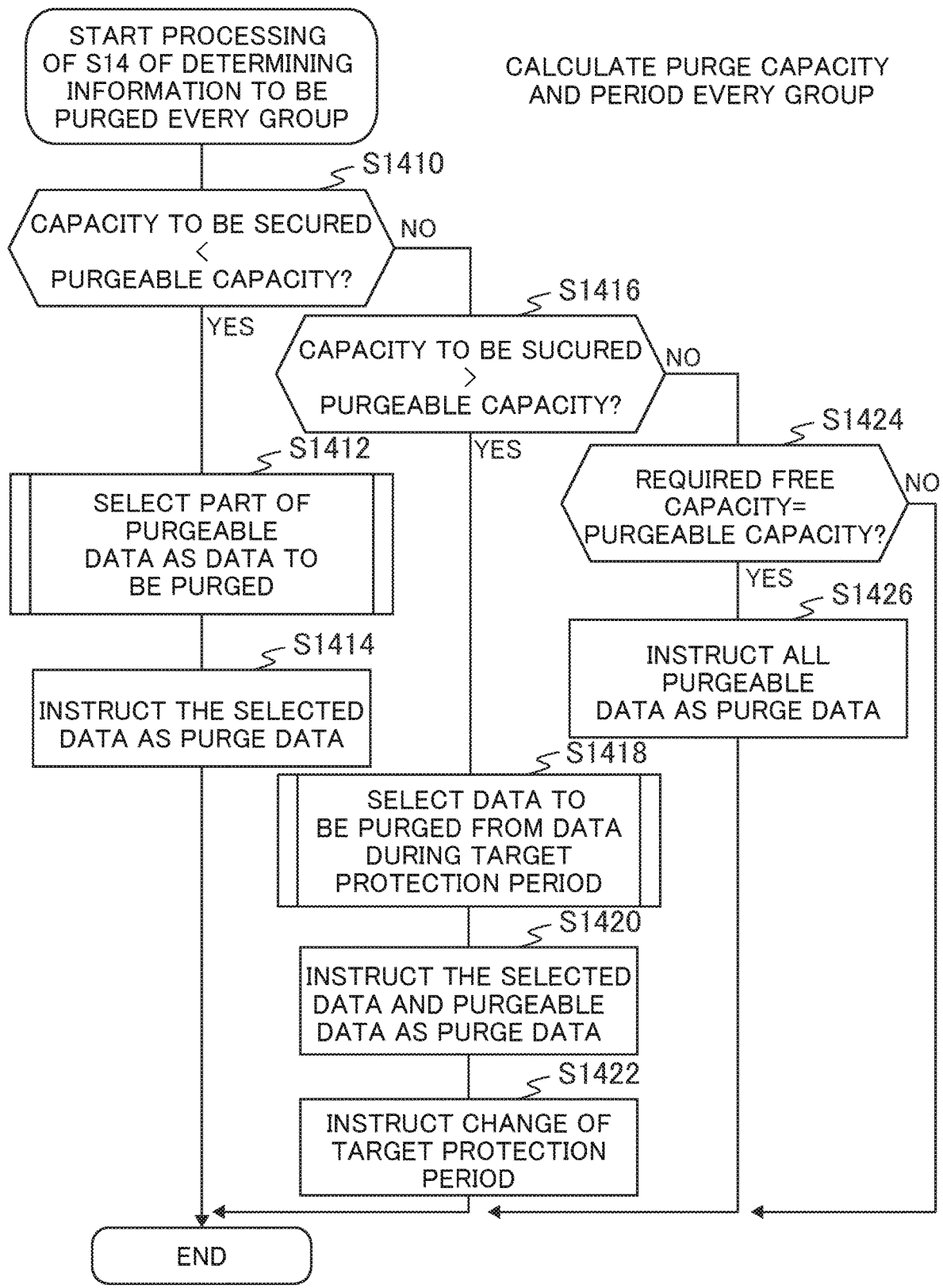
FIG. 16 is a flowchart showing processing of determining which data of data in a protectable period in a pool should be purged.

FIG. 16 is the processing of S14 of determining the information to be purged every group. That is, FIG. 16 is a flowchart diagram showing processing of determining which data of the data in the protectable period in the pool determined in S13 is purged.

The storage controller 101 executes the pool capacity recovery program 413. The capacity to be ensured can be calculated by the required free capacity-present free capacity as insufficiency of the required free capacity. The capacity to be ensured and the total amount (purgeable capacity) of the data amounts during the protectable period in all groups belonging to the pool are compared with each other (S1410). When the capacity to be ensured is small, the storage controller proceeds to S1412. Otherwise, the storage controller proceeds to S1416. When the capacity to be ensured is small, processing of selecting data to be purged is performed (S1412). The data to be purged is notified, and the processing is ended (S1414). Since the protectable period is shortened as a result of the purging, the storage controller 101 controls the protectable period instructed in S1414 upon restoring actually to be displayed on a display device of the management system 205 or the like.

When the capacity to be ensured in S1410 is large (S1416), the capacity is not sufficient even if all data in the protectable period are purged, and hence data to be purged is selected from the data in the protectable period (S1418).

The data selected in S1418 and the data in the protectable period are instructed (S1420). Further, a change of the target protection period is instructed by being controlled to be displayed on the display device of the management system 205 or the like (S1422). When the change of the target protection period is instructed, the purge S15 is executed where a manager permits the change. That is, when a signal of approving the shortening of the target protection period is input from the manager, the storage controller executes purge processing. Since the target protection period is shortened as a result of purging, the storage controller 101 controls the instructed target protection period to be displayed on the display device or the like upon restoring actually. When almost all journals should be purged to satisfy the capacity to be ensured, or when the capacity is less than the capacity to be ensured even by the purging, the capacity of the pool may be expanded.

When the capacity to be ensured and the purgeable capacity are equal to each other in S1424, journals of all data in the protectable period are instructed as purge data (S1426). With the purging, a change of the protectable period is controlled to be displayed on the display device of the management system 205 or the like.

When the capacity to be ensured and the present free capacity are the same, the purging of all the data in the protectable period is instructed.

Figure 17:
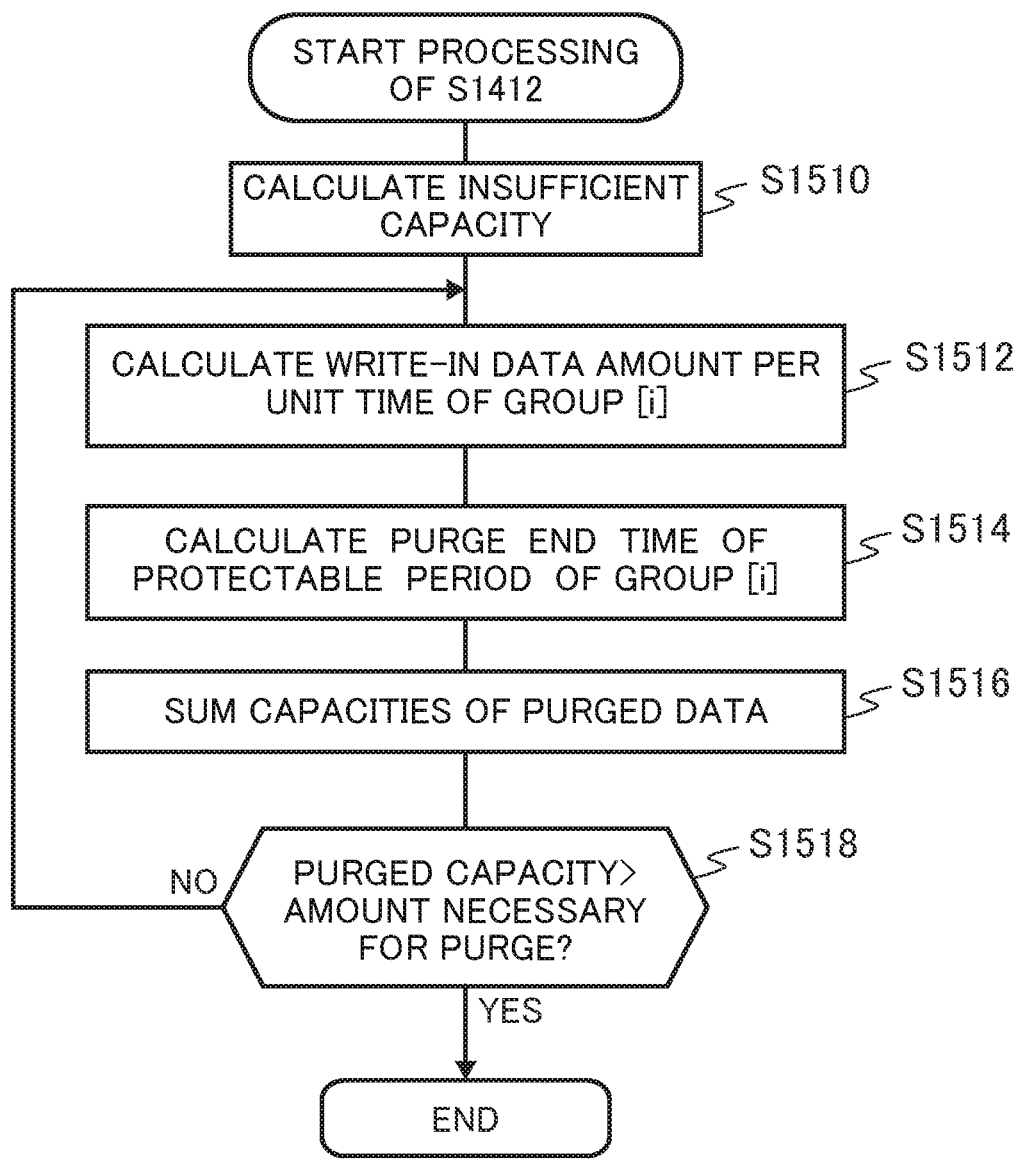
FIG. 17 is a flowchart showing processing of selecting data to be purged from within the data in the protectable period.

FIG. 17 is a flowchart diagram showing one example of the processing of S1412. Data to be purged is selected from the data in the protectable period.

When the data in the protectable period is purged, the meta information at the old times in the time 621 of the meta information are selected in order, and the data stored in the addresses shown in the data storage destination 625 are purged. The amount of data to be purged in each group is determined in such a manner that data in the protectable period corresponding to the same period are left from the target protection period of each group belonging to the pool.

Assume that a period in which data is left from the target protection period is x. For example, when a target protection period of a group #1 in a certain pool is 3 days, a target protection period of a group #2 is 1 week, and x is 16 hours, the group #1 purges data shown in meta information at a time earlier than 3 days+16 hours from the present time. The group #2 purges data shown in meta information at a time earlier than 1 week+16 hours.

The capacity (insufficient capacity) to be purged is calculated by the following equation (S1510).

Capacity to be purged=required free capacity−present free capacity

A time that the total amount of write data from the time when the time of meta information during the protectable period is the oldest time to a certain time of meta information becomes the capacity to be purged, is obtained.

Similarly to FIG. 14, a write-in data amount $s\_wdata[i]$ per unit time of the group[i] being a write-in data amount per unit time every group belonging to the pool is obtained (S1512). Assuming that the write-in data amount per unit time of the group[i] is $s\_wdata[i]$, and the oldest time in the past of the group[i] is [i], a purge end time $t\_p\_end[i]$ of the group[i]:

Purging period=the purged capacity/$\Sigma s\_wdata[i]$

Purge end time $t\_p\_end[i]$=oldest time [i] in the past+purging period (S1514)

Of the write data in the protectable period, the write data from the oldest time of the time in the meta information to $t\_p\_end[i]$ is purged.

From the above, the purging of the group[i] belonging to the pool is successively performed. The data stored in the addresses stored in the data in order from the oldest time of the time in the meta information of the group[i] are purged. A location where data is stored is released to provide a free area. The meta information is also deleted. The amounts of the purged data are summed and retained (S1516). If the purge processing for all the groups in the pool is ended, and the sum of the amounts of the purged data exceeds the capacity to be purged, the processing is finished. When it is not less than the purged capacity, further purging of write data during a protectable period is continued (S1518). When the purging is continued, the purge end time is advanced to perform purging.

Figure 18:
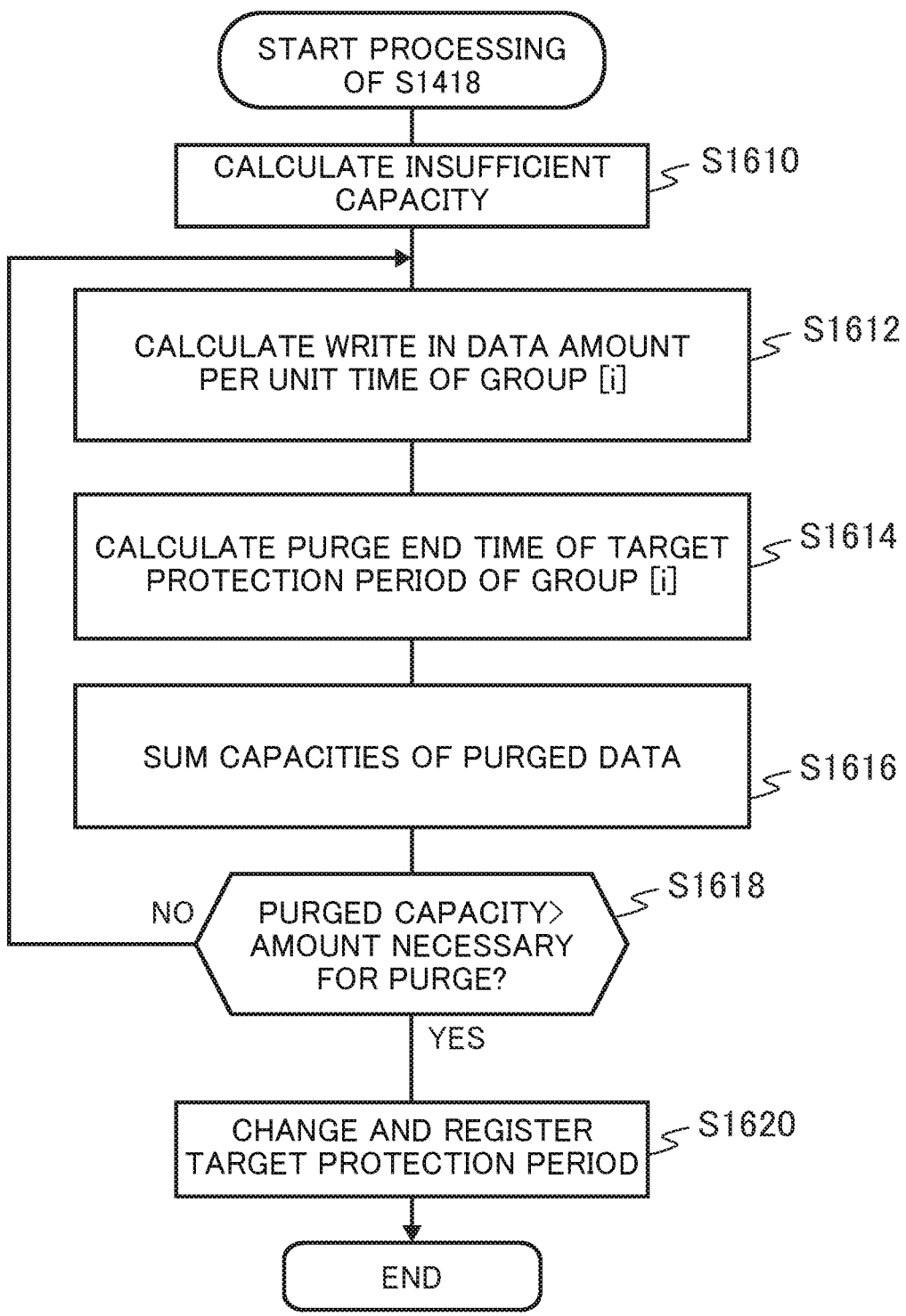
FIG. 18 is a flowchart showing processing of determining which data among data in a target protection period should be purged.

FIG. 18 illustrates a flowchart diagram showing the processing of S1418. When just purging the data in the protectable period causes capacity insufficiency, the data in the target protection period is also required to be purged, and hence which data should be purged is determined. Data to be purged is selected in such a manner that shortening times of target protection periods in a plurality of groups belonging to the pool become the same.

The insufficient capacity of the pool is calculated from the capacity to be ensured—the total amount of data in the protectable period (S1610).

Reference is made to a write-in data amount per unit time from the target protection period in the pool (S1612).

The write data of the meta information are purged in order from the oldest time in the target protection period to obtain a purge end time at which an accumulative amount of their purge amounts becomes larger than the pool insufficient capacity obtained in S1610.

Purging period=the capacity to be purged/$\Sigma s\_wdata[i]$

Purge end time $t\_p\_end[i]$=past oldest time[i]+purging period (S1614)

Of the write data in the target protection period, the write data from the oldest time of the time in the meta information to $t\_p\_end[i]$ are purged.

From the above, the purging of the group[i] belonging to the pool is successively performed. The data stored in the addresses stored in the data in order from the oldest time of the time in the meta information of the group[i] are purged. A location where the data is stored is released to provide a free area. The meta information is also deleted. The amounts of the purged data are summed and retained (S1616). If the purge processing for all the groups in the pool is ended, and the sum of the amounts of the purged data exceeds the capacity to be purged, the processing proceeds to S1620. When it is not less than the purged capacity, further purging of write data during a protectable period is continued (S1618). When the purging is continued, the purge end time is advanced to perform purging.

When the purging is finished, a report is made as to the change of the target protection period and the present target protection period (S1620).

In another embodiment, when there is a group in which the target protection period is less than one day, the target protection period in the group does not change. That is, the write data in the meta information during the target protection period in the above group is not deleted.

In a further embodiment, the protectable period can be set every group. Further, the protectable period can also be matched with a ratio between the groups in the target protection periods. For example, when the group #1 takes 2 days as the target protection period, and the group #2 takes 4 days as the target protection period, the group #1 and the group #2 respectively protect a history corresponding to 1 days and a history corresponding to 2 days by the present purge processing.

Figure 19:
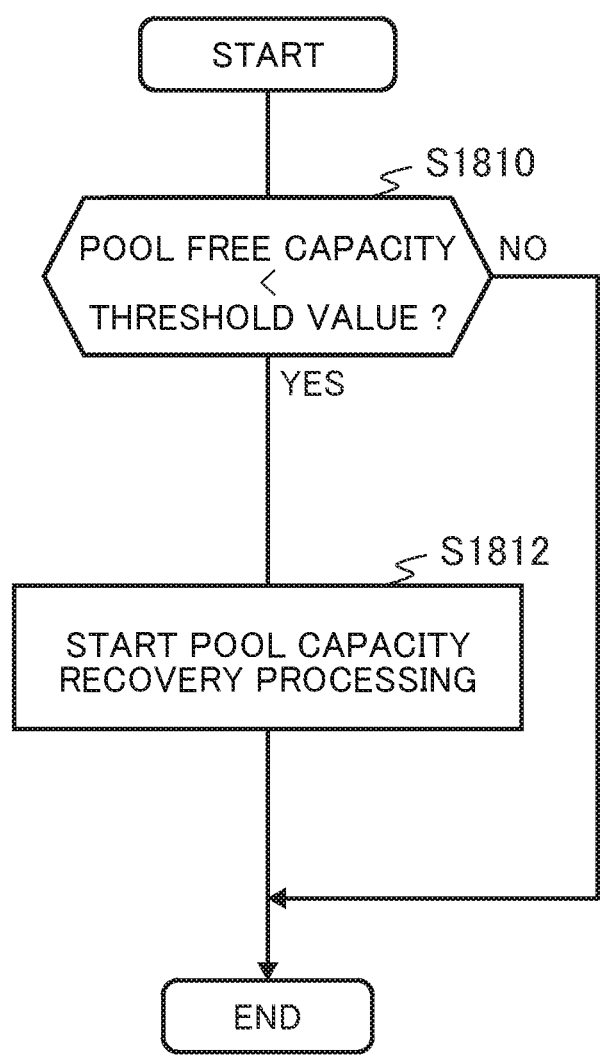
FIG. 19 is a flowchart showing processing of starting processing to recover a pool capacity.

FIG. 19 is a flowchart diagram showing processing of starting processing of recovering a pool capacity.

A free capacity in the pool is monitored on a regular basis. A threshold value set in advance and the free capacity in the pool are compared (S1810). When the free capacity falls below the threshold value, the pool capacity recovery processing of S10 is started (S1812).

When a pool capacity is checked in another processing at other than the regular monitoring to thereby determine that the free capacity is small, the processing is started.

In addition to the above, a user or a system manager may also give instructions to start the pool capacity recovery processing. At this time, the user or system manager gives instructions via the management system 201 or from a terminal (not shown) connected to the storage system.

In a yet another embodiment, there is known a method of realizing data protection by obtaining a snapshot in the storage system 200. A snapshot technique has been described in Japanese Patent No. 5657801.

As described above, the required free capacity of the pool storing the history information for executing the restoration processing is calculated. The capacity of the history information being the surplus period having passed the target protection period is calculated. Which information of the history information being the surplus period having passed the target protection period should be purged is determined.

Since the purge period is calculated in such a manner that the difference between the target protection period and the actual protection period becomes small in each group in the pool, the pool can be prevented from filling up while equally leaving the history information during the period protectable among the groups.

Second Embodiment

Figure 20:
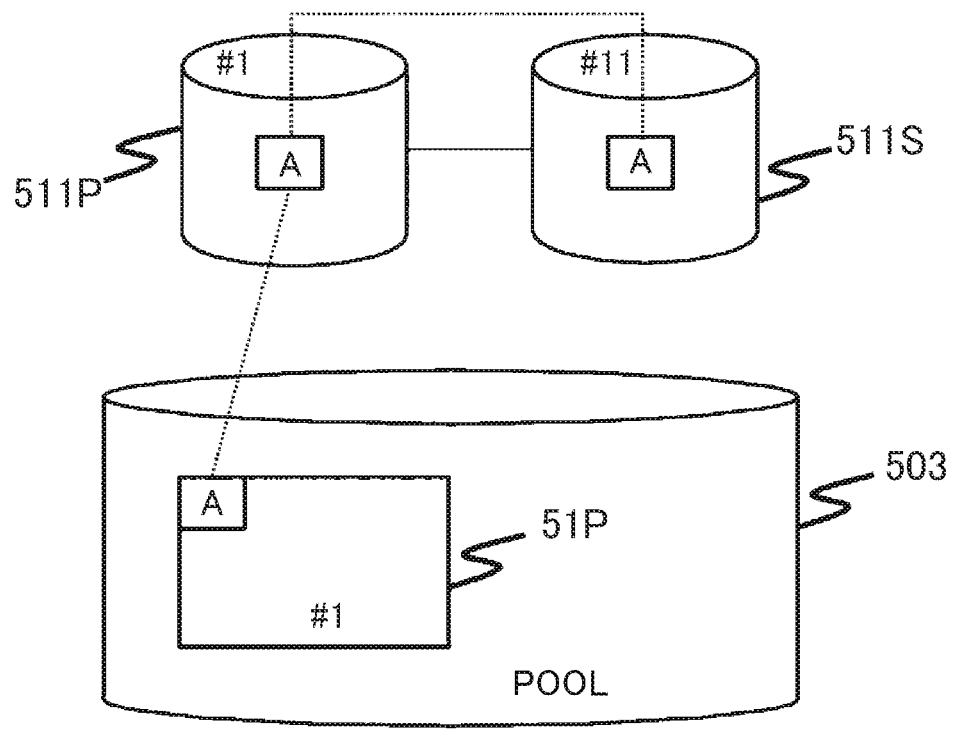
FIG. 20 is a diagram describing a snapshot configuration in the storage system.

FIG. 20 is an explanatory diagram of a snapshot configuration in a storage system 200. A replication volume 511S of a volume 511P is provided at least one or more within the storage system 200 by a snapshot control program 414 lying in a local memory 401. The volume 511P and the volume 511S are generated by virtualizing physical storage areas included in each PDEV 220. The virtualization of the volume 511P is similar to that described in FIG. 4. Also, the volume 511P may be generated directly from the physical storage area included in the PDEV 220 without virtualizing it. Further, the volume 511P and the volume 511S may be storage areas other than the volumes. A description will be made below by using the volumes, but the essence of the invention remains unchanged.

In the volume 511P, a snapshot volume is created by the snapshot control program 414. The volume 511P is a PVOL volume whose storage contents are protected by the snapshot volume 511S. The volume 511P is a real volume used for work, which is connected to a server system 201 and stores data written from the server system 201. The server system 201 is capable of writing data into the volume 511P and reading the data from the volume 511P.

The volume 511S is a snapshot volume of the volume 511P and is a volume which maintains the storage contents of the volume 511P at a predetermined point of time in the past. When the volume 511P is snapshotted at a certain point of time, the volume 511S is protected as a state at that time. The snapshot can be taken plural. When a snapshot SSVOL #11 is taken at a certain point of time t0, and a snapshot SSVOL #12 is taken from the time point t0 to a future time point t1, the volume 511P at each of the time points t0 and t1 can be protected. For example, when a failure occurs at a time point tx between the time points t0 and t1, the volume can be restored to the time point t0.

As described in FIG. 4, a page 51 of a pool 503 is assigned to a page of the volume 511P. As shown in FIG. 20, after the snapshot acquisition, in terms of the page 51, the volume 511S as a copy destination of the volume 511P refers to the page 51 of the volume 511P. That is, after duplication of the volume #1, the page 51P is referenced from the volume #1. Further, the page 51P is referenced indirectly via the volume #1 even from the volume #11 being the snapshot of the volume #1.

FIG. 21 is a diagram showing an example of an address translation table 422_1. The address translation table 422_1 is set every volume 511. The address translation table 422_1 retains information about the relation between a logical address (in-VOL address) as a reference source and a logical address as a reference destination.

For example, the address translation table 422_1 has entries every page or block. Each entry stores therein information such an in-VOL address 911, a reference destination page #912, a reference VOL 913, and a data size 914. The following description will be made by taking for example one block 601 (called a "target block").

The in-VOL address 911 is information about a logical address (e.g., head logical address) of the target block in the volume 511P. The reference destination page #912 is information about a logical address (logical address in reference destination pool) corresponding to a logical address of a target block in the page of the reference destination pool of the target block. The reference VOL 913 is a number of a volume referring to the in-VOL address 911, of the snapshot volume 511S of the volume 511P. The data size 914 is information about the size of the target block.

Figure 22:
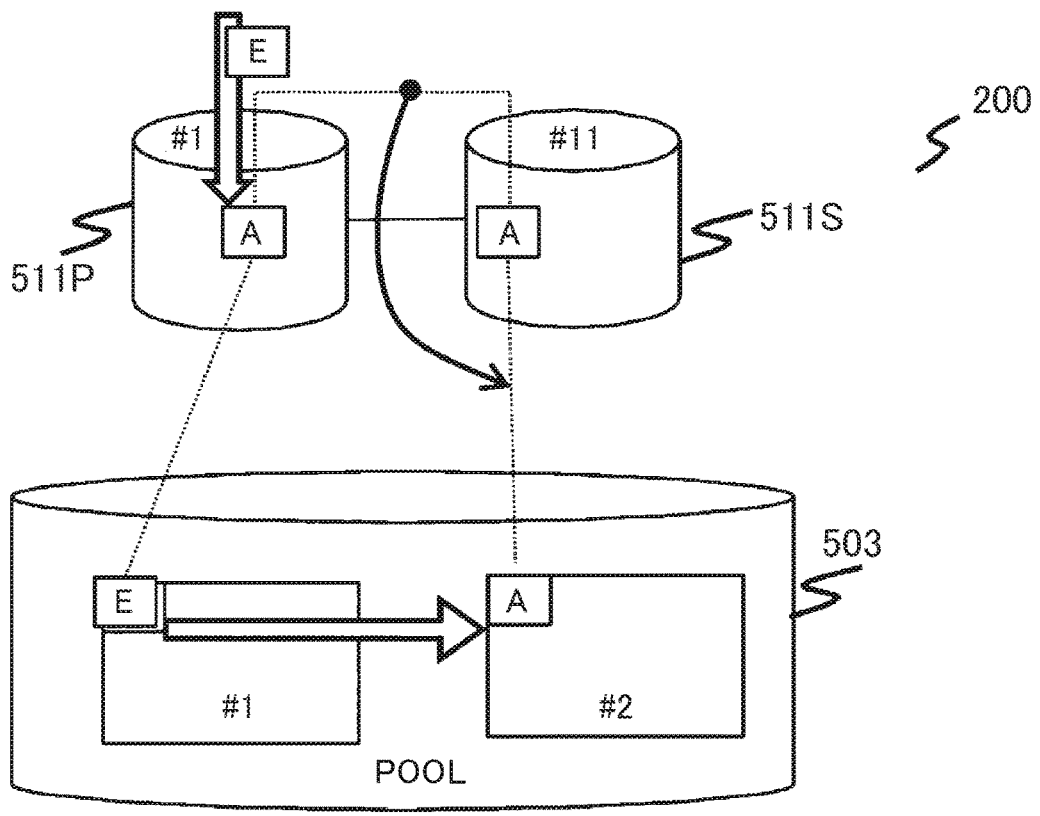
FIG. 22 is a diagram describing processing of writing into a volume where a snapshot is acquired.

FIG. 22 is a diagram describing write processing to the volume 511P in the configuration of FIG. 20. It will be described by referring to FIG. 20 as appropriate.

A dataset A of the volume #1 is mapped to actual data stored in the pool. When another volume #11 being the snapshot of the volume #1 is snapshotted, all addresses of the volume #11 refer to the volume #1 being a snapshot source. That is, the volume #11 refers to the dataset stored in the pool via the volume #1.

Processing of updating the dataset A is shown in FIG. 22. Since the dataset A of the volume #1 is referenced from another volume #11, the dataset A is back-up copied to a new area in a pool area, e.g., a newly-ensured page #2 before updating of the dataset A. The volume #11 switches a point destination to the dataset A of the volume #1 to a save destination area of the dataset A. Then, the reference destination page 912 of the address translation table 422_1 in the volume #11 is updated to the switched point destination. Thereafter, a dataset E being new write data is overwritten on an area in which the dataset A has been stored.

Figure 23:
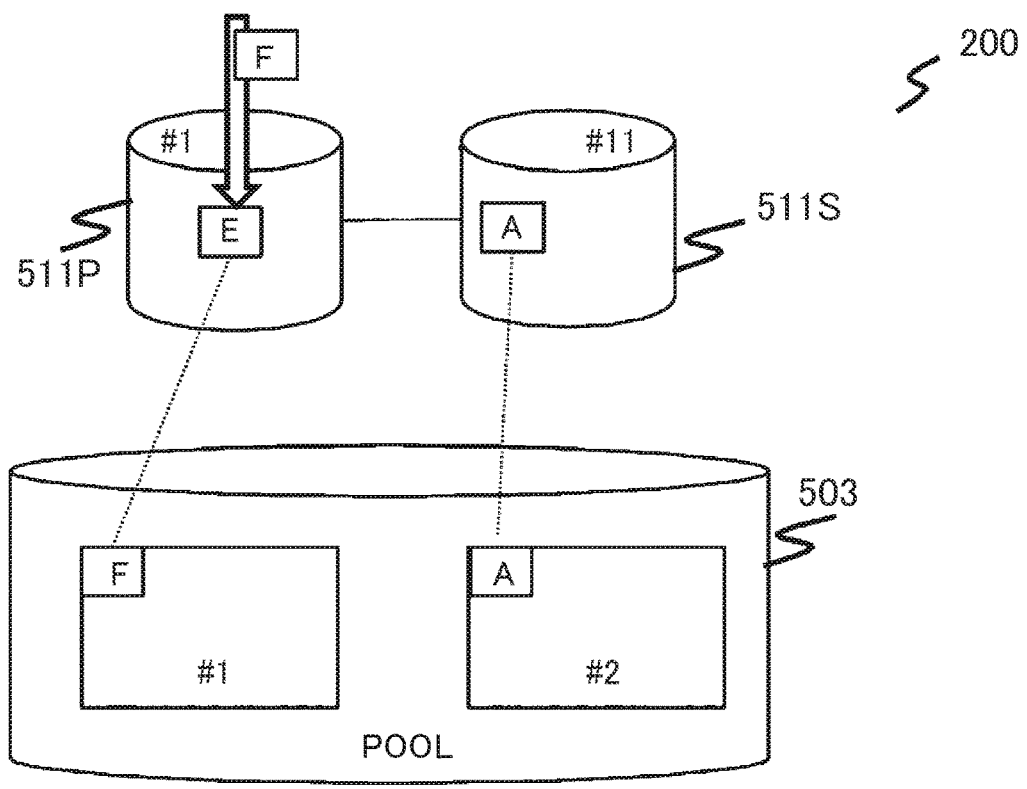
FIG. 23 is a diagram describing processing of writing into a volume where a snapshot is acquired.

When write processing is further performed on the same area, for example, if the dataset E is not referenced from another volume, a dataset F is overwritten on the area in which the dataset E has been stored (refer to FIG. 23).

Figure 24:
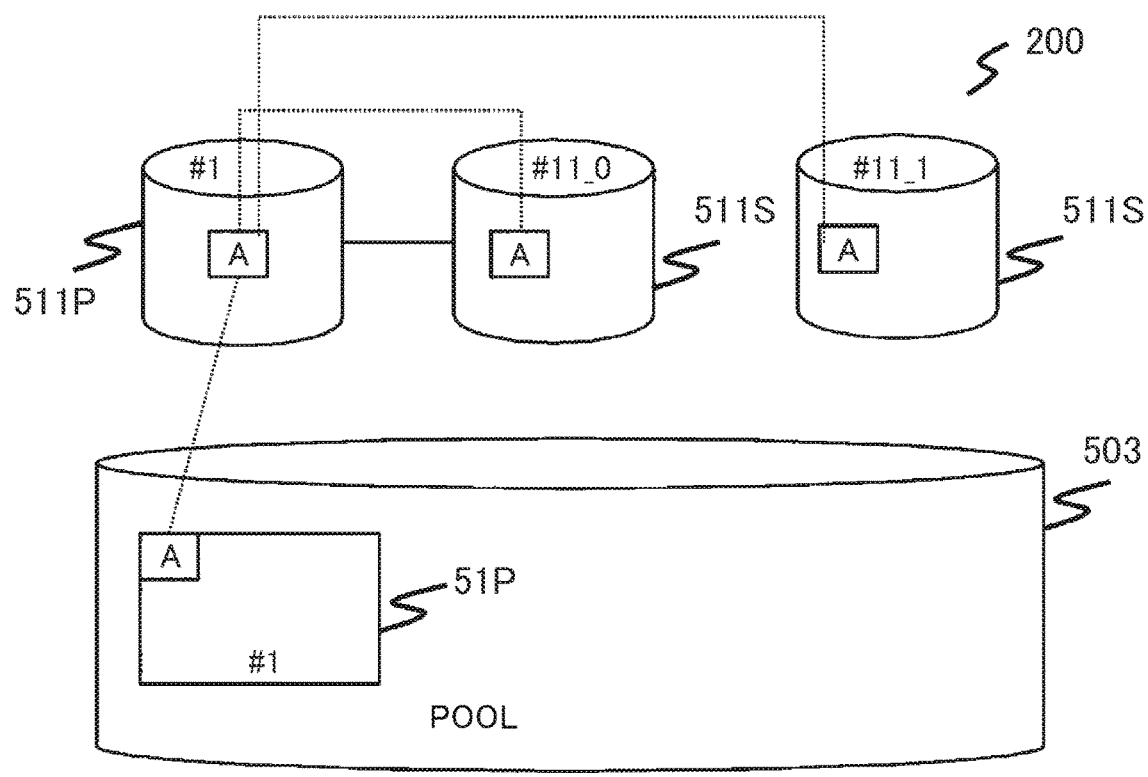
FIG. 24 is a diagram describing processing of writing into a volume where two snapshots are acquired.
Figure 25:
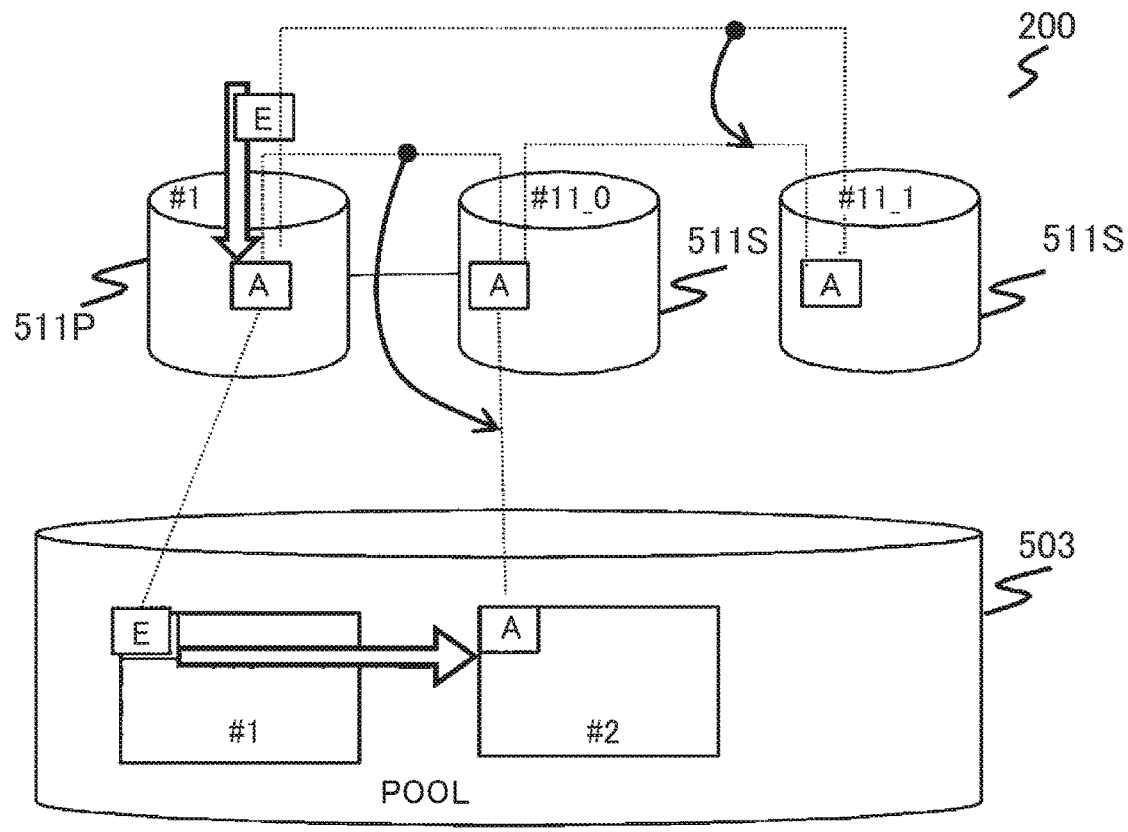
FIG. 25 is a diagram describing processing of writing into a volume where two snapshots are acquired.

When the snapshot of the volume #1 is taken plural, the oldest volume #11_0 at a snapshot acquisition time, of snapshot volumes #11_0 to n is pointed to the save destination dataset A, and the other snapshot volume #11_n refers to the volume #11_0 (refer to FIGS. 24 and 25). As shown in FIG. 24, when the two snapshots of the volume #1 are taken for the volumes #11_0 and #11_1, the volume #11_0 and the volume #11_1 both point the volume #1. As shown in FIG. 25, when the dataset E is overwritten on the dataset A, the volume #11_0 points the saved and stored dataset A, and the volume #11_1 points the volume 11_0. The volume #11_1 refers to the dataset A through the volume #11_0.

As another embodiment, the pool 503 may be divided into an area for a virtual volume and an area for the snapshot to manage each amount to be used.

In the second embodiment, one or a plurality of volumes 511P can be protected as CDP targets. That is, only one volume 511P can be protected alone, or a plurality of volumes 511P can be grouped by a consistency group 521_n and also protected as the whole group. That is, the group is data, volumes or a volume group, which is set identically in protection period, and is the consistency group 521_n. This is equivalent to the CDP group 520_n shown in FIG. 4, which has been described in the first embodiment.

Figure 26:
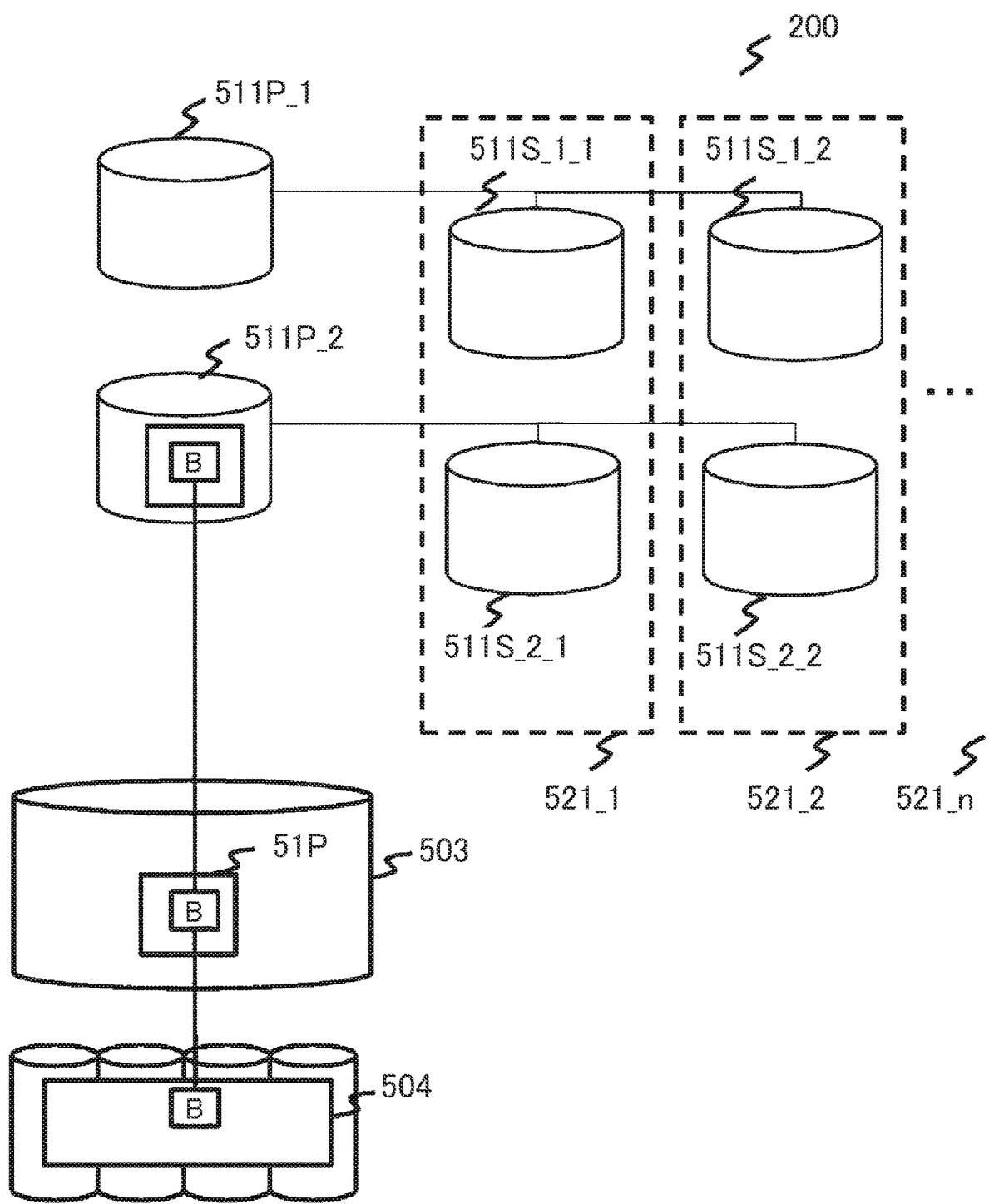
FIG. 26 is a diagram showing a consistency group.

FIG. 26 shows a consistency group in the configuration of FIG. 20.

The consistency group 521 includes the same generation as that for the volume 511S being the snapshot of the volume 511. For example, a volume 511S_1_1 being a snapshot volume of a volume 511P_1, and a volume 511S_2_1 being a snapshot volume of a volume 511P_2 belong to a consistency group 521_1. A target protection period is set every consistency group 521. The target protection period is provided every consistency group 521 in such a manner that, for example, the consistency group 521_1 takes a target protection period as 3 days and the consistency group 521_2 takes a target protection period as one day. The processing of FIG. 1 is performed on the basis of the target protection period of the consistency group 521.

As another embodiment, the details of the processing of S1112 in the processing (refer to FIG. 14) of predicting and calculating the required capacity of the pool in S11 of FIG. 1 are shown. In the case of the second embodiment, in terms of the overwrite processing of performing rewriting to the already-written data, a new area for saving the old data is required if another volume having taken the snapshot refers to the old data subjected to the overwrite processing.

If another volume does not refer to the old data subjected to the overwrite processing, the new area is not required because of overwriting on the old data. From this, the frequency of first overwriting on the data and the frequency of second and subsequent overwriting are monitored and the required capacity is predicted. For example, A in the volume #1 of FIG. 20 is referenced from the volume #11. E in the volume #1 of FIG. 23 is not referenced even from any snapshot generation. The storage controller 101 executes the pool capacity recovery program 413 to monitor write request numbers per unit time and overwrite request numbers thereof, thereby predicting a first write frequency, a second write frequency, and third and subsequent write frequencies. In the first writing, a data storage capacity is required, and even in the second writing, a data storage capacity for saving is required. Since only overwriting is performed on an area in which data is stored, after the third writing, a new capacity is not required. A write-in data amount per unit time is calculated from the write frequency to predict a required pool capacity.

As another method, the same capacity as the capacity of a business volume may be set as a required pool capacity by a snapshot.

As described above, since the data subjected to the past write request is purged such that the target protection period and protectable period of each group belonging to the pool become the same, the pool is controlled so as not to be full, while increasing each group capable of achieving an expected data protection period.

Although one embodiment has been described above, this is one illustration and is not the purpose to limit the scope of the present invention to only the present embodiment.

The present invention can be implemented even in other various forms. For example, the transmission source (I/O source) of the I/O request like the write request is the server system 201 in the above-described embodiments, but may be an unillustrated program (e.g., application program executed on VM) in the storage system 200.

What is claimed is:

1. A storage system, comprising:
   a storage controller comprising a plurality of volumes, wherein the plurality of volumes are logical volumes further comprising logical storage areas;
   and
   a pool comprising one or more physical storage areas, wherein the volumes use the pool to allocate the physical storage areas to the logical storage areas of the volumes,
   wherein the storage controller includes:
   a first group including, among the volumes, at least one first primary volume to which a first target protection period is set, wherein the first target protection period is a period during which storage contents of the first primary volume can be returned to a time point in the past, a first copying volume which stores a copy of the first primary volume at a first predetermined time, and a first history information volume which stores first primary volume history information about past updates to the first primary volume, and
   a second group including, among the volumes, at least one second primary volume to which a second target protection period is set, wherein the second target protection period is a period during which storage contents of the second primary volume can be returned to a time point in the past, a second copying volume which stores a copy of the second primary volume at a second predetermined time, and a second history information volume which stores second primary volume history information about past updates to the second primary volume,
   wherein the volumes included in the first group and the second group utilize the same physical storage area of the pool, and
   wherein when a free capacity of the pool is insufficiently large to store the first target protection period and a first protectable period, wherein the first protectable period is a period prior to the first target protection period, and the second target protection period and a second protectable period, wherein the second protectable period is a period prior to the second target protection period and is longer than the second target protection period, first primary volume history information and second primary volume history information to be purged is determined from the first protectable period and the second protectable period in such a manner that a predetermined relation is formed between the first protectable period and the second protectable period.

2. The storage system according to claim 1, wherein the predetermined relation is that the first protectable period and the second protectable period become the same.

3. The storage system according to claim 1, wherein the first primary volume history information and second primary volume history information to be purged is reflected on the first copying volume and the second copying volume respectively.

4. The storage system according to claim 1, wherein the storage controller controls the first protectable period and the second protectable period, which have been shortened as a result of purging the first primary volume history information and second primary volume history information to be purged, by causing the first protectable period and the second protectable period to be displayed on a display device.

5. The storage system according to claim 1, wherein a part of the first primary volume history information, and a part of the second primary volume history information are purged so as to increase a free capacity of the pool such the first target protection period and the second target protection period are shortened to become the same length.

6. The storage system according to claim 5, wherein the storage controller controls the first target protection period and the second target protection period, which have been shortened as a result of purging the first primary volume history information and second primary volume history information to be purged, by causing the first protectable period and the second protectable period to be displayed on a display device.

7. The storage system according to claim 6, wherein the storage controller executes purge processing of the first primary volume history information and second primary volume history information to be purged in response to an input signal to approve shortening the displayed target protection periods.

8. The storage system according to claim 1, wherein the storage controller includes:
the first group comprised of, among the volumes, a first snapshot volume storing a first generation snapshot of the first primary volume to which the first target protection period is set, and a second snapshot volume storing a first generation snapshot of the second primary volume to which the second target protection period is set, and
the second group comprised of, among the volumes, a third snapshot volume storing a second generation snapshot of the first primary volume to which the second target protection period is set, and a fourth snapshot volume storing a second generation snapshot of the second primary volume to which the second target protection period is set.

9. A history information management method of a storage system including a storage controller comprising a plurality of volumes, wherein the plurality of volumes are logical volumes further comprising logical storage areas, and a pool comprising one or more physical storage areas, wherein the volumes use the pool to allocate the physical storage areas to the logical storage areas of the volumes, comprising the steps of:
configuring the storage controller to include a first group including, among the volumes, at least one first primary volume to which a first target protection period is set, wherein the first target protection period is a period during which storage contents of the first primary volume can be returned to a time point in the past, a first copying volume which stores a copy of the first primary volume at a first predetermined time, and a first history information volume which stores first primary volume history information about past updates to the first primary volume, at least one second primary volume to which a second target protection period is set, wherein the second target protection period is a period during which storage contents of the second primary volume can be returned to a time point in the past, a second copying volume which stores a copy of the second primary volume at a second predetermined time, and a second history information volume which stores second primary volume history information about past updates to the second primary volume;
configuring the volumes included in the first group and the second group to utilize the same physical storage area of the pool; and
when a free capacity of the pool is insufficiently large to store the first target protection period and a first protectable period, wherein the first protectable period is a period prior to the first target protection period, and the second target protection period and a second protectable period, wherein the second protectable period is a period prior to the second target protection period and is longer than the second target protection period, determining first primary volume history information to be purged from the first protectable period and the second protectable period in such a manner that a predetermined relation is formed between the first protectable period and the second protectable period.

* * * * *